United States Patent
Kumar et al.

(10) Patent No.: US 11,574,637 B1
(45) Date of Patent: Feb. 7, 2023

(54) SPOKEN LANGUAGE UNDERSTANDING MODELS

(71) Applicant: Amazon Technologies, Inc., Seattle, WA (US)

(72) Inventors: Anoop Kumar, Fountain Valley, CA (US); Anil K Ramakrishna, Los Angeles, CA (US); Sriram Venkatapathy, Belmont, MA (US); Rahul Gupta, Waltham, MA (US); Sankaranarayanan Ananthakrishnan, Belmont, MA (US); Premkumar Natarajan, Rolling Hills Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 17/014,042

(22) Filed: Sep. 8, 2020

(51) Int. Cl.
*G10L 15/30* (2013.01)
*G10L 15/22* (2006.01)
*G10L 13/02* (2013.01)
*G06N 20/20* (2019.01)

(52) U.S. Cl.
CPC .............. *G10L 15/22* (2013.01); *G06N 20/20* (2019.01); *G10L 13/02* (2013.01); *G10L 15/30* (2013.01); *G10L 2015/223* (2013.01)

(58) Field of Classification Search
USPC ......................... 704/246, 247, 275, 251, 252
See application file for complete search history.

(56) References Cited

U.S. PATENT DOCUMENTS

| | | | |
|---|---|---|---|
| 10,854,206 B1 * | 12/2020 | Liu ....................... G06F 16/176 |
| 2018/0309866 A1 * | 10/2018 | Devaraj ............ H04M 3/42238 |
| 2022/0028379 A1 * | 1/2022 | Carbune ................ G06N 20/00 |

* cited by examiner

*Primary Examiner* — Leonard Saint-Cyr
(74) *Attorney, Agent, or Firm* — Pierce Atwood LLP

(57) ABSTRACT

Techniques for using a federated learning framework to update machine learning models for spoken language understanding (SLU) system are described. The system determines which labeled data is needed to update the models based on the models generating an undesired response to an input. The system identifies users to solicit labeled data from, and sends a request to a user device to speak an input. The device generates labeled data using the spoken input, and updates the on-device models using the spoken input and the labeled data. The updated model data is provided to the system to enable the system to update the system-level (global) models.

20 Claims, 13 Drawing Sheets

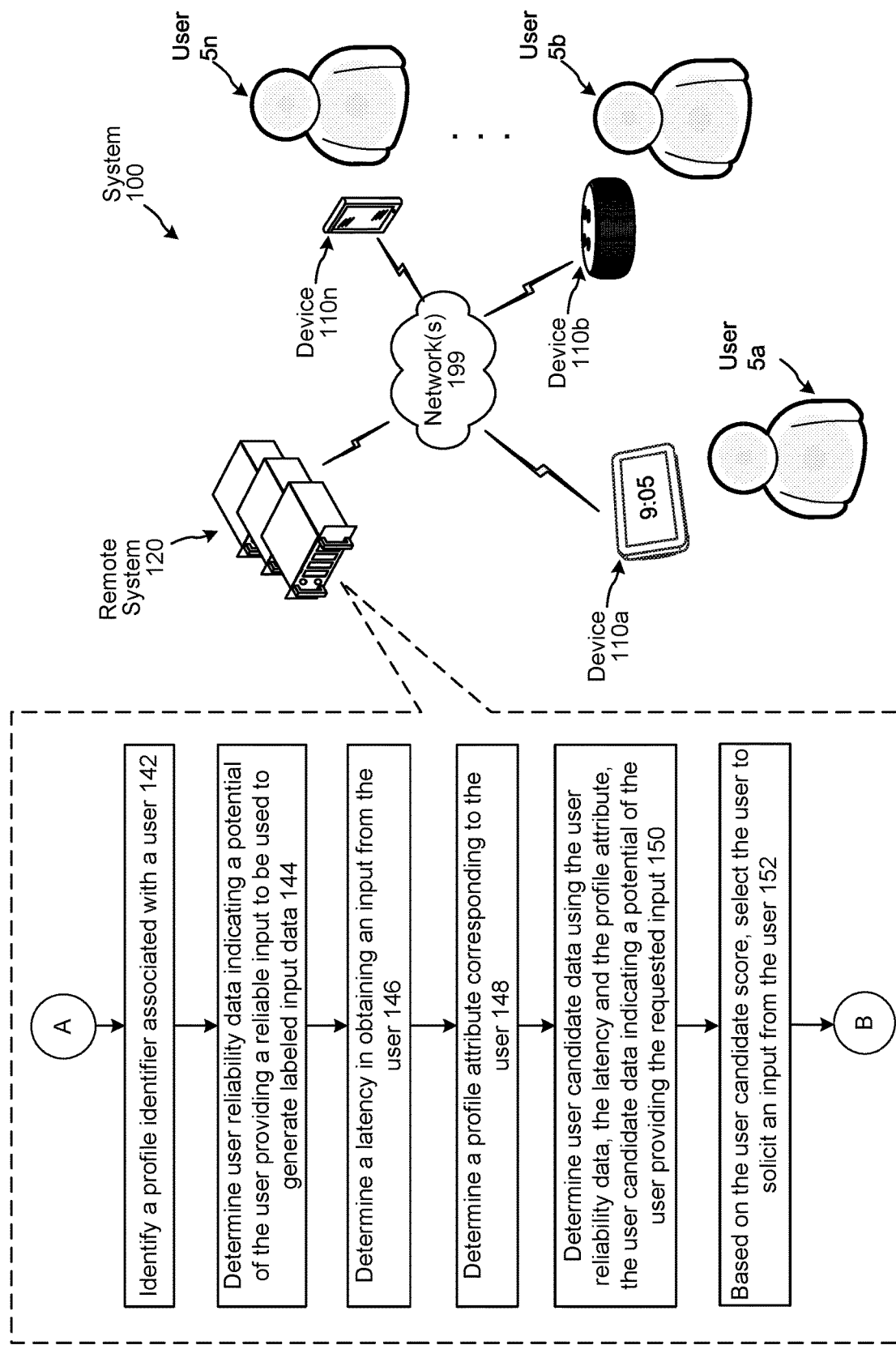

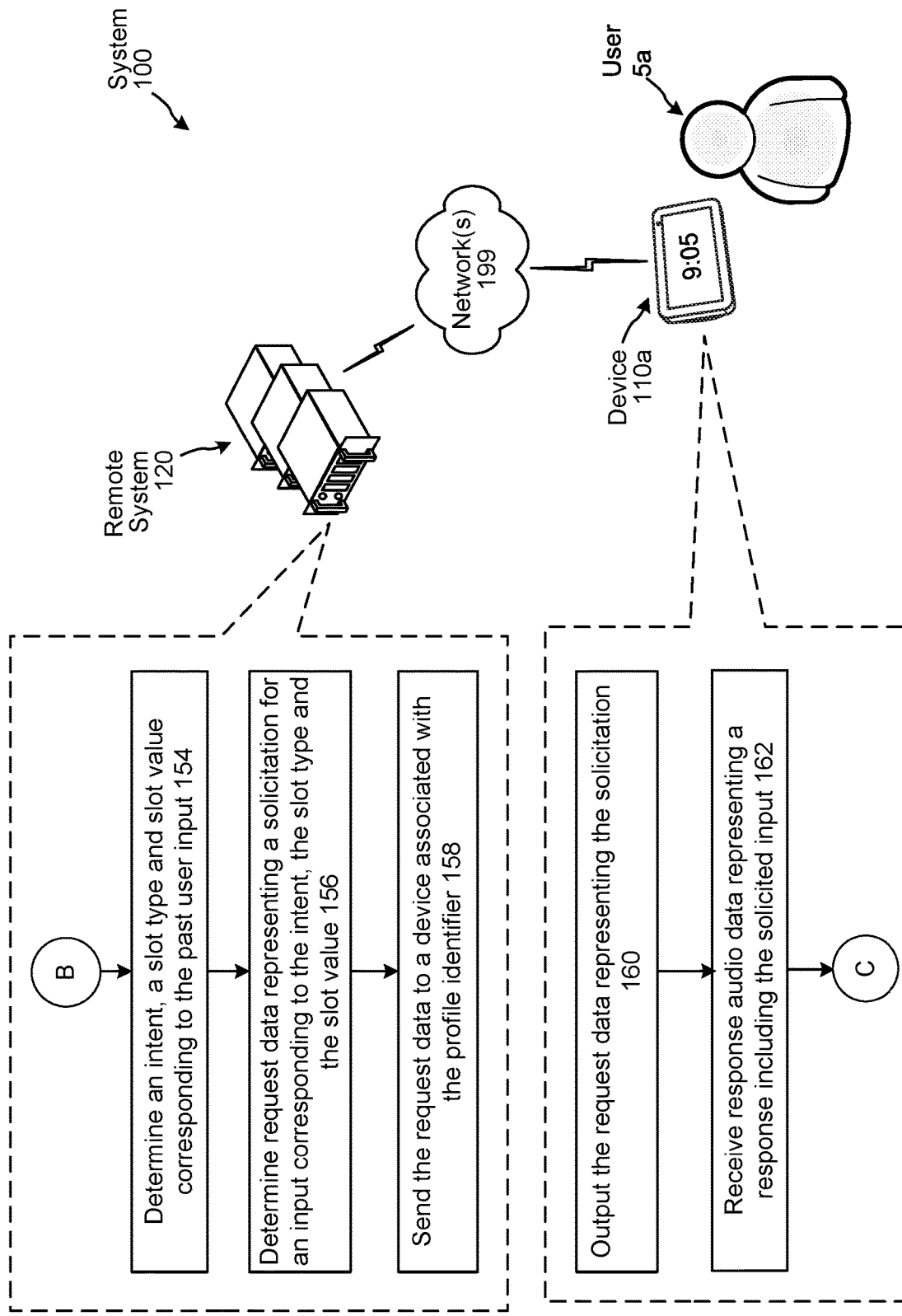

SPOKEN LANGUAGE UNDERSTANDING MODELS

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1D are conceptual diagrams illustrating a system configured to request an input from a user to generate labeled input data to update one or more machine learning (ML) models, according to embodiments of the present disclosure.

DETAILED DESCRIPTION

Figure 1A:
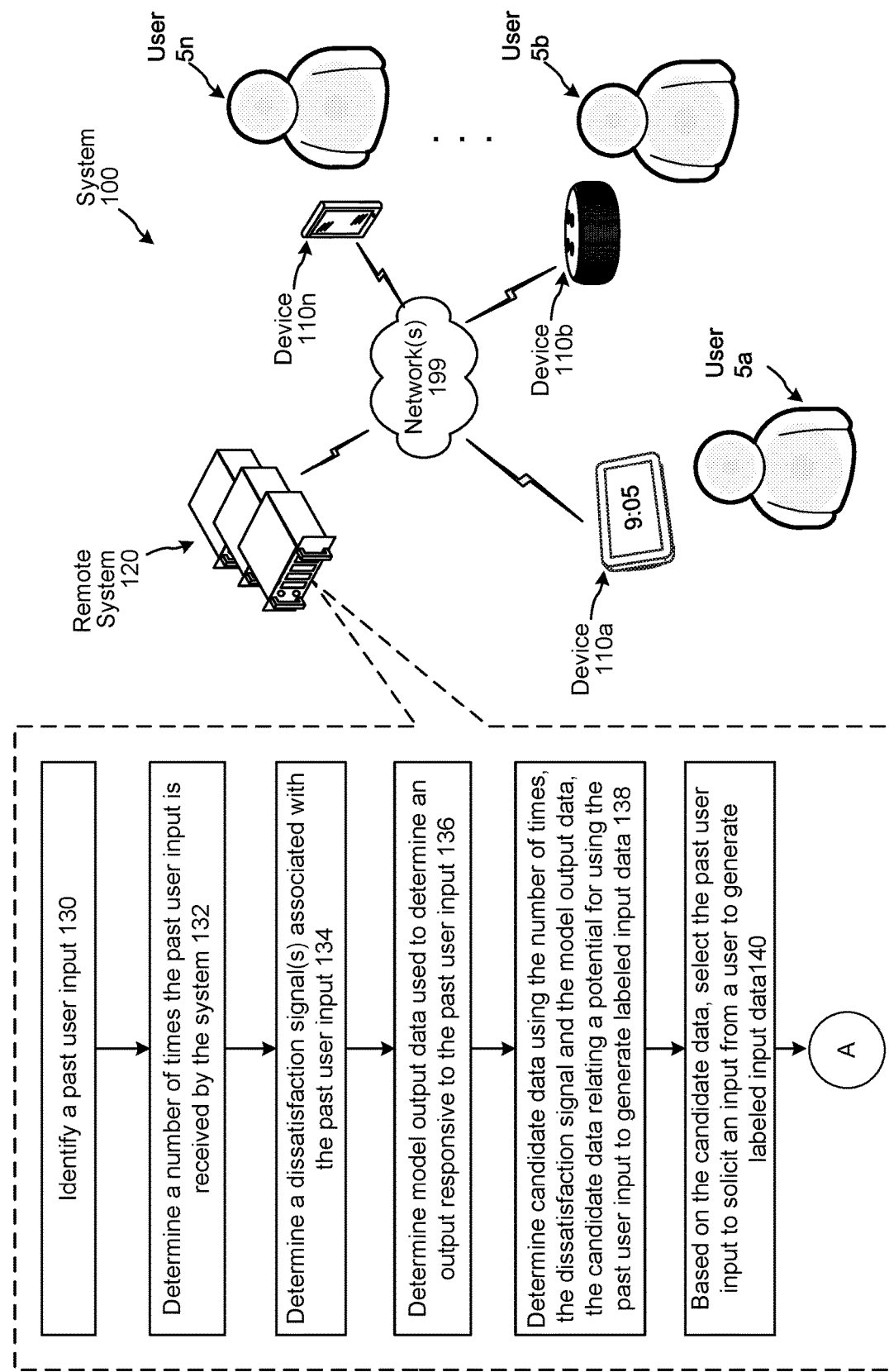

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) component of a system. Text-to-speech (TTS) is a field of computer science concerning transforming textual and/or other data into audio data that is synthesized to resemble human speech.

A system may be configured to generate outputs in response to natural language inputs (e.g., spoken and/or text-based natural language inputs) provided by a user. For example, for the natural language input "what is the weather in Seattle," a system may output the weather in Seattle at the time the input was received. For further example, for the natural language input "play the movie <title>," a system may cause a television (or other display device) to play the requested movie. In another example, for the natural language input "add milk to my shopping list," a system may cause an application to add milk to a virtual shopping list.

A user may provide a spoken natural language input to a device that is capable of processing the natural language input using a SLU component (or using a separate ASR component and a NLU component). In this case, the device receives audio corresponding to the natural language input, generates audio data corresponding to the audio, and processes the audio data, using the on-device SLU component, to determine a meaning of the natural language input. The on-device SLU component (similar to a SLU component of a remote system) includes one or more machine learning (ML) models to process spoken natural language inputs.

The present disclosure provides a system that employs a federated learning framework where the on-device ML models are updated using user data (e.g., user provided natural language inputs), and the updates made to the ML models (e.g., gradient data, weights, parameters, etc.) are communicated to the remote system to update the ML models of a SLU component of the remote system. Use of the federated learning framework minimizes a need to provide the user data to the remote system. In other words, use of the herein discloses federated learning framework enables user data to remain stored at the user's device.

For ML models of a speech processing system (a type of remote system) that has a complex space of outputs labels, it is a non-trivial task to obtain annotated data (representing ground truth labels for the ML models) without using a centralized annotation workflow (which is implemented at the remote system). The unavailability of such annotated data on user devices makes federated learning difficult thereby impeding ML model improvements. The present disclosure provides a system that solves the foregoing problems, among others, by, for example, obtaining relevant training data by soliciting inputs from users via the devices. In some embodiments, the system may: (1) identify which ML model output labels annotated data is needed, (2) identify one or more users to solicit inputs from, and (3) after obtaining the input, the system may annotate the input with the output labels. The annotated input can then used by the device to update the on-device SLU component, and the updated model data may be sent to the remote system to update the SLU component of the remote system.

For example with respect to the first step mentioned above, the system may identify the output labels by selecting natural language inputs that caused a dissatisfied user experience. Dissatisfaction may be caused when the system provides an output that is unresponsive to the user input (e.g., an undesired response, such as, "I am unable to process your request", the system plays the wrong song, the system times-out and does not respond at all, etc.). To select the natural language inputs, the system may process past interaction data, between multiple different users and the system, to determine which natural language inputs caused a dissatisfied user experience. The system may also consider other signals provided by the user in determining which natural language inputs caused dissatisfaction, where these signals may include the user interrupting the system while it is presenting an output (e.g., by saying the wake word and/or "stop" when a response is being outputted), facial expressions or gestures indicating negative feedback (e.g., nodding of head, rolling of eyes, etc.), sounds by the user indicating negative feedback (e.g., sigh), frustration or other indicative emotion is detected in the user's voice, a user's response to a satisfaction question (e.g., the system asking, "did that answer your question"), and/or other signals that may indicate that the system presented an undesired response to the user's input. Using a natural language input that resulted in a dissatisfied user experience, the system may determine corresponding output labels, for example, NLU intent and slot information. For example, for the natural language input "what is the weather in Seattle," the system may determine the output labels intent: GetWeatherIntent, slot type: city, and slot value: "Seattle."

In next step, the system may identify users to send a request to provide an input. A user may be identified based on the quality of inputs provided by the user in the past, based on the responsiveness of the user with respect to how long it takes the user to respond to past requests, and/or based on one or more profile attributes of the user (e.g., demographic information).

The system may send, to a device of an identified user, a request to provide an input corresponding to the output labels identified in the first step. For example, if a natural language input corresponding to the output labels: intent: GetWeatherIntent, slot type: city, and slot value: "Seattle" is resulting in a dissatisfied user experience, then the system-generated request to the identified user may be "can you tell me how you would ask for the weather in Seattle?" The system-generated request may be output as synthesized speech and/or may be displayed as text on the user's device. In response to the system-generated request, the user may provide a spoken response representing how the user would ask for the weather in Seattle.

After receiving the response, the user device can process the audio data corresponding to the response, associate the intent label with the audio data (e.g., intent: GetWeatherIntent), identifie portions of the audio data that represent the slot value(s), and associate the slot value label(s) with the corresponding identified portion(s). The labeled audio data can then be used by the device to update the on-device ML model(s). Upon updating the on-device ML model(s), the user device may send the updated model to the remote system, in response to which the remote system may update its ML model(s).

Aspects of the present disclosure improve the user experience by updating a system's ML model(s) to reduce dissatisfaction in user experiences, while also minimizing the need to send user data to the remote system. Moreover, teachings of the present disclosure relate to improved methods of obtaining training data for updating on-device ML models and system ML models.

A system may be configured to incorporate user permissions and may only perform activities disclosed herein if approved by a user. As such, the systems, devices, components, and techniques described herein are configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system, the device and/or user are located.

FIGS. 1A-1D illustrate a system 100 configured to request an input from a user, where the input is used to generate labeled input data to update one or more ML models. Although the figures and discussion of the present disclosure illustrate certain steps in a particular order, the steps described may be performed in a different order (as well as certain steps removed or added) without departing from the present disclosure. As shown in FIGS. 1A-D, the system 100 may include one or more devices 110a-110n (local to one or more users 5a-5n) in communication with a remote system 120 across one or more networks 199. The network(s) 199 may include a local or private network, or may include a wide network such as the Internet.

The remote system 120 may be configured to process natural language inputs and determine outputs responsive to the natural language inputs. At a high level, the remote system 120 selects a past user input to use for generating labeled input data, selects a user 5a (from users 5a-5n) to send a request to for the purpose of providing an input to generate labeled input data, and sends the request to the device 110a associated with the user 5a. The device 110a receives, from the user 5a, a response to the request, processes the response to generate labeled input data, and updates an on-device ML model (at the device 110a) using the labeled input data.

Referring to FIG. 1A, the remote system 120 identifies (130) a past user input. The past user input may be identified from a database storing data representing multiple different past user inputs received by the remote system 120. These past user inputs may be provided by multiple different users 5a-5n to the remote system 120 via one or more devices (e.g., one or more of the devices 110a-110n). A past user input may be stored in the database as text data or token data (e.g., generated by an ASR component 250 as described below).

The database may store representations of the past user inputs, where the representations may be determined using a hash functions, thus the representations may be hash-value based representations of the past user input. The devices 110a-110n may receive the past user input, determine a (hash value based) representation of the past user input, and send the representation of the past user input directly to the database or the remote system 120 for storing in the database. In some embodiments, the representation of the past user input may be determined using other techniques. In this manner, in some embodiments, the remote system 120 may not use/have access to the exact past user input, but rather uses a representation of the past user input. In other embodiments, where the remote system 120 is associated with a particular organization and configured to process user inputs from a defined set of users of the organization (and may be closed off to external systems/users), then the remote system 120 may use past user inputs, rather than a representation of the past user inputs.

The remote system 120 determines (132) a number of times the past user input was received by the remote system 120. In addition to the aforementioned database storing data representing past user inputs, the database may also store (for each past user input) a number of times the past user input was received by the remote system 120. In some embodiments, the database may not store the number of times, but rather may simply store different entries, where each entry corresponds to a different instance when a past user input was received by the remote system 120. In such embodiments, the remote system 120 may determine the number of times the past user input was received by evaluating the data stored in the database, and determining the number of different entries corresponding to the past user input. In determining the number of times the past user input was received, the remote system 120 may, in some embodiments, determine how many times the past user input was received from a different user (thus counting multiple instances of the past user input, provided by the same user, as a single instance of receiving the past user input).

The remote system 120 determines (134) a dissatisfaction signal(s) associated with the past user input. Previous run-time processing of the past user input by the remote system 120 may have resulted in an undesired response for different users 5a-5n. The users 5a-5n, in response to receiving the undesired response, may have expressed dissatisfaction and provided negative feedback in different ways, for example, by saying the system output is wrong, interrupting the response by the remote system 120, asking the remote system 120 to stop or cancel outputting of the response, using other verbal cues (e.g., sighing, not providing another input to continue the interaction, etc.), using non-verbal cues (e.g., facial expressions, shaking the head, etc.), and the like. Each of the devices 110a-110n, in some embodiments, may send data representing feedback from the users 5a-5n along with the representation of the past user input. The database storing data representing the past user inputs may also store, for each instance of receiving the past user input, a user's feedback to the output presented in response to that instance of the past user input. Using the stored data, the remote system 120 may determine the dissatisfaction signal(s) for the past user input. In some embodiments, the dissatisfaction signal represents dissatisfaction of multiple different users with the output provided by the remote system 120. In some embodiments, a single user 5a may provide multiple different types of feedback (e.g., interrupting the system output, shaking of the head, etc.), which may result in multiple dissatisfactions signals being associated with the past user input.

In some embodiments, the feedback from multiple users 5a-5n is processed to determine which feedback relates to/conveys dissatisfaction. The remote system 120 may determine a numerical representation corresponding to the feedback that relates to dissatisfaction. In some embodiments, the remote system 120 may determine the numerical representation by mapping a particular type of feedback to a particular numerical value (e.g., interrupting the system output may be mapped to 10; shaking of head may be mapped to 5, etc.) The various numerical representations of the feedback from different users 5a-5n may be aggregated to determine the dissatisfaction signal.

The remote system 120 determines (136) model output data used to determine an output responsive to the past user input. The remote system 120 may use one or more ML models to process the past user input to determine an output responsive to the past user input. As described below in relation to FIG. 2, the remote system 120 may use a SLU component 240, an ASR component 250 and/or a NLU component 260 to process the past user input. The model output data may include a confidence score that may represent a confidence score determined by the SLU component 240, the ASR component 250 or the NLU component 260 while processing the past user input. In the case that the processing of the past user input was performed on a local device, such as the device 110 and as described in relation to FIG. 3, the model confidence score may represent a confidence score determined by the SLU component 340, the ASR component 350 or the NLU component 360 while processing the past user input.

The remote system 120 determines (138) candidate data corresponding to the past user input using the number of times the past user input was received by the remote system 120, the dissatisfaction signal associated with the past user input and the model output data, where the candidate data indicates a potential for using the past user input to generate labeled input data. Based on the candidate data associated with the past user input, the remote system 120 selects (140) the past user input to solicit an input from a user to generate labeled input data. For example, the remote system 120 may determine different candidate data by performing the processes of steps 132, 134, 136, and 138 with respect to different past user inputs. The remote system 120 may compare the candidate data for the different past user inputs, and select the past user input with the highest/best candidate data/potential. As such, the selected past user input may be a frequently provided user input that the remote system 120 has trouble processing and/or providing a desired response to.

Referring to FIG. 1B, the remote system 120 identifies (142) a profile identifier that associated with the user 5a, and the remote system 120 determines (144) user reliability data indicating a potential of the user providing a reliable input to be used to generate labeled input data. The system 120 may use past interaction data associated with the profile identifier to determine the user reliability data. The past interaction data may represent interactions between the remote system 120 and the user 5a associated with the profile identifier, and may include inputs, provided by the user 5a, in response to system-generated requests for inputs. In determining the user reliability score, the remote system 120 may determine the number of times the user 5a has provided an input in response to past system-generated requests. The remote system 120 may also determine whether these inputs were used to generate past labeled input data and used to update one or more ML models. If the remote system 120 determines the past interaction data (associated with the user profile identifier) represents the user 5a responded to system-generated requests often/frequently, and if the remote system 120 determines the inputs provided by the user were often/frequently used to update ML models, then the remote system 120 may determine a user reliability score may be higher than that compared to another user.

The remote system 120 determines (146) a latency in obtaining an input from the user 5a (corresponding to the user profile identifier). The latency may be with respect to the time in receiving an input from the user 5a in response to a system-generated request. The latency may be with respect to network processing between sending the request to the user 5a to provide an input and receiving a response from the user 5a.

The remote system 120 determines (148) a profile attribute corresponding to the user profile identifier (i.e., corresponding to the user 5a). The remote system 120 may identify a particular profile attribute corresponding to users that have been experiencing dissatisfaction with how the system responds to the past user input. For example, the remote system 120 may have difficulty in processing the past user input when received from a particular group of users, for example, users from a particular geographic region, users who speak a particular language, or users who have a particular accent. Based on determining that users with a particular profile attribute are experiencing dissatisfaction with respect to the identified past user input, the remote system 120 may determine to select a user profile associated with that profile attribute to provide an input to generate labeled data.

The remote system 120 determines (150) user candidate data, corresponding to the user profile, using the user reliability data, the latency and the profile attribute, the user candidate data indicating a potential of the user providing the requested input. Based on user candidate data, the remote system 120 selects (152) a user profile identifier (corresponding to a user 5*a*) to solicit an input from the user. For example, the remote system 120 may determine different user candidate data by performing the processes of steps 142, 144, 146, 148, and 150 with respect to different user profile identifiers for the users 5*b*-5*n*. The remote system 120 may compare the user candidate data for different user profile identifiers, and select the user profile identifier with the highest/best user candidate data/potential. As such, the user candidate data may indicate a user that is likely to respond to a system-generated request for an input, and provide an input that can be used to generate labeled input data for updating ML models.

Referring to FIG. 1C, the remote system 120 determines (154) an intent, a slot type(s) and a slot value(s) corresponding to the past user input (selected in step 140). The remote system 120 may determine the intent, the slot type(s) and the slot value(s) using the database storing data related to past user inputs, which may also store the corresponding intent, slot type(s) and slot value(s) for a past user input. The intent, slot type(s) and slot value(s) corresponding to the past user input may be based on a correct annotation or labeling of the past user input, which may be performed manually (rather than using a ML model(s)).

The remote system 120 determines (156) request data representing a solicitation for an input corresponding to the intent, the slot type(s) and the slot value(s). The request data may represent a request, to the user 5*a*, to provide an input corresponding to the intent, the slot type(s) and the slot value(s). The request data may be structured data that may be used to generate synthesized speech representing the request. The request data may be text data that may be displayed or included in a notification to the user 5*a*. The remote system 120 sends (158) the request data to a device (e.g., device 110*a*) associated with the profile identifier of the user 5*a*.

The device 110*a* outputs (160) the request data representing the solicitation. The device 110*a* may output content (e.g., audio, corresponding to synthesized speech, and/or text) corresponding to the request data. As described above, the request data may request the user to provide an input that particularly relates to the intent, slot type(s) and slot value(s) determined in step 154. The device 110*a* receives (162) response audio data representing a response including the solicited input (from the user 5*a*).

Figure 1D:
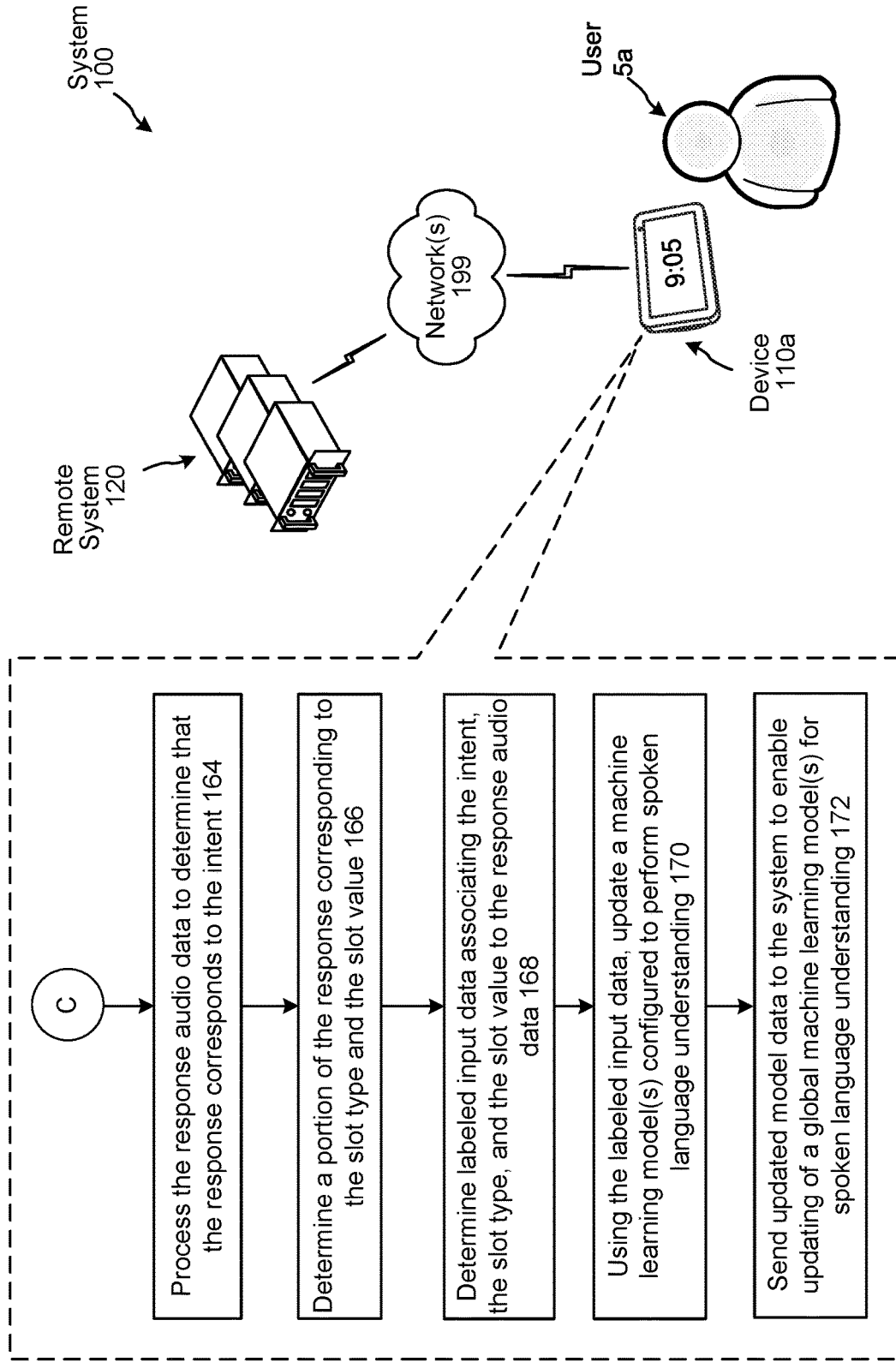

Referring to FIG. 1D, the device 110*a* processes (164) the response audio data to determine that the response corresponds to the intent. The device 110*a* may use one or more ML models to determine whether the response audio data corresponds to the intent or not. The device 110*a* determines (166) a portion(s) of the response corresponding to the slot type and the slot value(s) of the request data. If the request data indicated a particular slot type, the device 110*a* may determine a portion(s) of the response audio data corresponding to the slot type. The device 110*a* may use one or more ML models to determine whether a portion of the response audio data corresponds to the slot type(s) and/or the slot value(s). The device 110*a*, in some embodiments, may use other techniques, like parsing, to determine a portion(s) of the response audio data corresponding to the slot type and slot value. The response audio data may be processed to determine text data representing the response or ASR token data representing the response, and portions of the text data or the ASR token data may be determined to correspond to the particular slot type and slot value(s).

The device 110*a* determines (168) labeled input data associating the intent, the slot type and the slot value(s) to the response audio data. For example, the labeled input data may indicate the intent and the portion of the response audio data that corresponds to the slot type and slot value(s). Using the labeled input data, the device 110*a* updates (170) an on-device ML model(s) configured to perform spoken language understanding. For example, the device 110*a* may use the labeled input data as training data to update one or more ML models stored at the device 110*a*. After updating the one or more on-device ML models, the device 110 sends (172) updated model data to the remote system 120 to enable updating of a system ML model(s) for spoken language understanding. The updated model data may be gradient data, updated weights, updated parameters or other data corresponding to the updated on-device ML model at the device 110*a*. In this manner, the input provided by the user 5*a* is stored and processed locally at the device 110*a*, and only model updates are provided to the remote system 120.

The remote system 120 may determine a first candidate score corresponding to the past user input identified in step 130. The remote system 120 may evaluate multiple other past user inputs, and determine various data corresponding to each of the other past user inputs as described in relation to steps 132, 134 and 136. Using this data, the remote system 120 may determine additional candidate scores, each corresponding to another past user input. For example, the remote system 120 may determine a second candidate score corresponding to a second past user input using a number of times the system received the second past user input, a dissatisfaction signal associated with the second past user input and a model confidence score associated with processing of the second past user input.

The remote system 120 may determine a first user candidate score corresponding to the user profile identifier identified in step 142. The remote system 120 may evaluate multiple other users 5*b*-5*n*, and determine various data corresponding to each of the other users as described in relation to steps 144, 146 and 148. Using this data, the remote system 120 may determine additional user candidate scores, each corresponding to another user. For example, the remote system 120 may determine a second user candidate score corresponding to a second user 5*b* using a user reliability score corresponding to the second user 5*b*, a cost factor in obtaining an input from the second user 5*b*, and a profile attribute corresponding to the second user 5*b*.

In a non-limiting example, the remote system 120 may select an example past user input "tell me the weather in Seattle" for soliciting labeled input data from the user 5*a*. The remote system 120 may determine the labels for the selected past user input to be intent: GetWeatherIntent slot type: location, slot value: "Seattle" slot type: time, slot value: "now". Using the labels, the remote system 120 may determine the request data to include a request for an utterance from the user 5*a*. The request may be "how would you ask for today's weather in Seattle?" and the user 5*a* may respond "what is the weather in Seattle?" Using the determined labels, the device 110a may generate the labeled input data by associating the intent: GetWeatherIntent with the response, and associating slot type: location, slot value: "Seattle" with the appropriate portion of the response. In another example, the request may be "how would ask for the weather in any city?" and the user 5a may respond "tell me today's weather for Boston." Using the labels, the device 110a may generate the labeled input data by associating the intent: GetWeatherIntent with the response, and associating slot type: location, slot value: "Boston" with the appropriate portion of the response.

Figure 2:
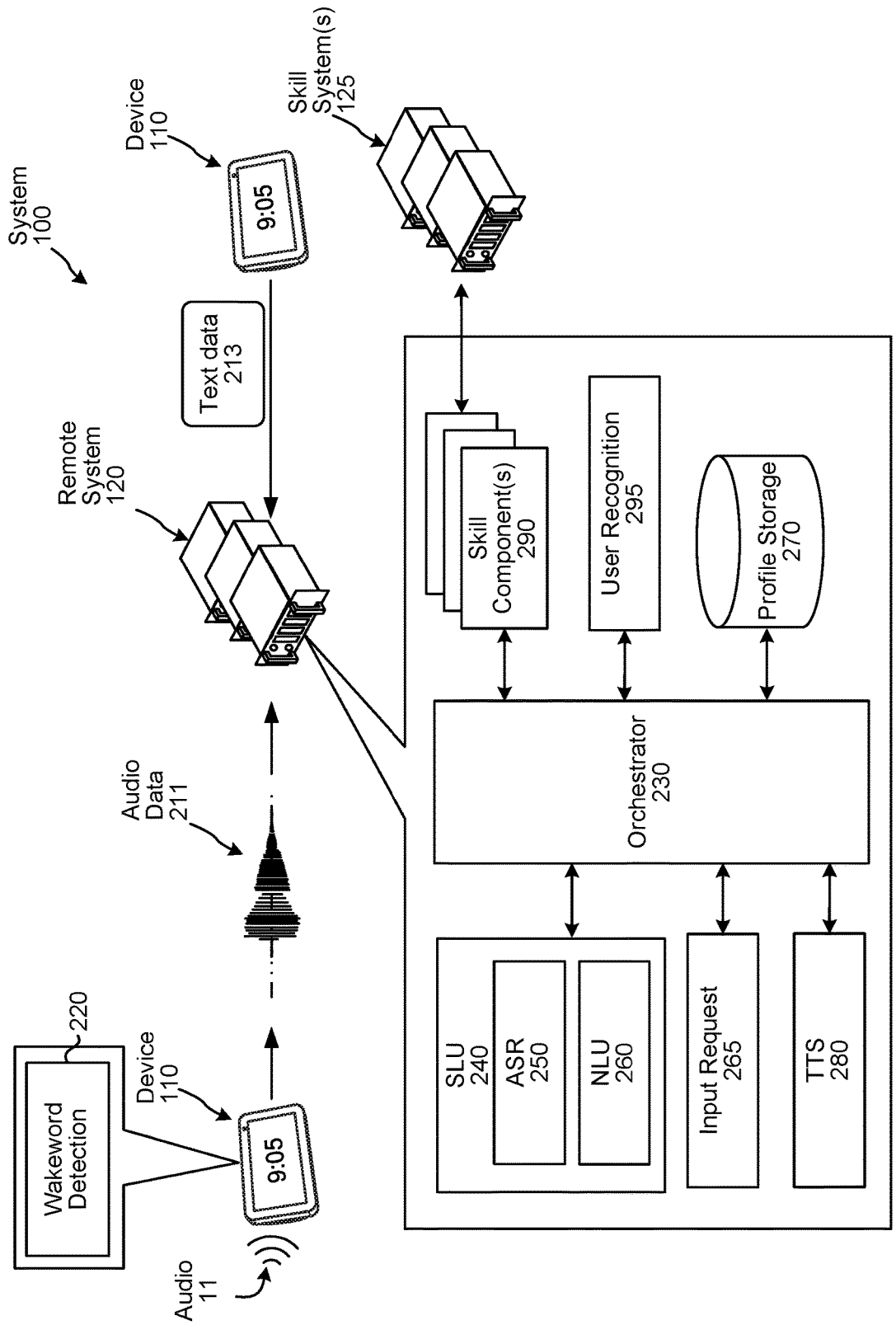
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented using techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 220 to perform to determine when the user 5 intends to speak an input to the device 110. The device 110 may be configured to detect various wakewords. In at least some examples, each wakeword may correspond to a different digital assistant. In at least some examples, a wakeword may correspond to a name of a digital assistant. Example wakewords include, but are not limited to, Alexa, echo, Amazon, and computer.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 220 detects a wakeword, the device 110 may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The remote system 120 may include an orchestrator component 230 configured to receive the audio data 211 from the device 110. The remote system 120 may include a spoken language understanding (SLU) component 240 configured to perform spoken language processing. As used herein, spoken language processing may refer to NLU processing, or a combination of ASR processing and NLU processing. In some embodiments, the SLU component 240 may employ one or more ML models that are configured to process audio data and determine, directly from the audio data, the meaning of the user input (e.g., intent and slot data). In other embodiments, the SLU component 240 may include an ASR component 250 that is configured to process audio data to determine ASR data (e.g., text data or token data) representing what the user said, and a NLU component 260 that is configured to process the ASR data to determine NLU data (e.g., intent and slot data).

The orchestrator component 230 may send the audio data 211 to an ASR component 250 that transcribes the audio data 211 into ASR output data including one or more ASR hypotheses. ASR output data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The ASR output data (output by the ASR component 250) may be input to a NLU component 260. The NLU component 260 attempts to make a semantic interpretation of the phrase(s) or statement(s) represented in the ASR output data. That is, the NLU component 260 determines one or more meanings associated with the phrase(s) or statement(s) represented in the ASR output data based on words represented in the ASR output data. The NLU component 260 determines an intent representing an action that a user desires be performed as well as pieces of the spoken input that allow the device 110 (or other device), the remote system 120, a skill system 125, etc. to execute the intent. For example, if the ASR output data corresponds to "play Adele music," the NLU component 260 may determine a <PlayMusic> intent and may identify "Adele" as an artist. For further example, if the ASR output data corresponds to "what is the weather," the NLU component 260 may determine an <OutputWeather> intent. In another example, if the ASR output data corresponds to "turn off the lights," the NLU component 260 may determine a <DeactivateLight> intent. The NLU component 260 may output NLU output data (which may include one or more intent indicators that are each associated with one or more portions of tagged text data).

As described above, the remote system 120 may implement the SLU component 240 as two different components (i.e., the ASR component 250 and the NLU component 260). In at least some embodiments, the SLU component 240 may be implemented as a single component equivalent to a combination of the ASR component 250 and the NLU component 260. In such embodiments, the SLU component 240 may process the audio data 211 and directly generate NLU output data, without an intermediate step of generating ASR output data. As such, the SLU component 240 may take audio data 211 representing speech and attempt to make a semantic interpretation of the speech.

The remote system 120 may include one or more skill components 290. A skill component 290 may be software running on the remote system 120 that is akin to a software application running on a traditional computing device. That is, a skill component 290 may enable the remote system 120 to execute user commands involving specific functionality in order to provide data or produce some other requested output. A skill component 290 may operate in conjunction between the remote system 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components.

A skill component 290 may be configured to execute with respect to NLU output data. For example, for NLU output data including a <GetWeather> intent, the remote system 120 (and more particularly the orchestrator component 230) may invoke a weather skill component to determine and output weather information for a geographic location represented in a user profile or corresponding to a location of the user device 110 that captured the spoken input. For further example, for NLU output data including a <BookRide> intent, the remote system 120 (and more particularly the orchestrator component 230) may invoke a taxi skill component may book a requested ride. In another example, for NLU output data including a <BuyPizza> intent, the remote system 120 (and more particularly the orchestrator component 230) may invoke a restaurant skill component to place an order for a pizza. A skill component 290 may operate in conjunction between the remote system 120 and other devices, such as the device 110, restaurant electronic ordering systems, taxi electronic booking systems, etc. in order to complete certain functions.

A skill component 290 may be associated with a domain, a non-limiting list of which includes a smart home domain, a music domain, a video domain, a weather domain, a communications domain, a flash briefing domain, a shopping domain, and a custom domain.

The functionality described herein as a skill component 290 may be referred to using many different terms, such as an action, bot, app, application, or the like.

In at least some embodiments, a skill component 290 may perform an action by interacting with a skill system 125, which may include one or more databases, other software, and/or the like. For example, a skill component 290 may send an instruction to a skill system 125 to execute specific functionality in order to provide data or perform some other action requested by the user 5. In some examples, a skill component 290 may send a request for data (e.g., request for information) to a skill system 125 and may receive the requested data from the skill system 125, enabling the skill component 290 to perform an action requested by the user 5. In other examples, a skill component 290 may send an instruction to the skill system 125 and the skill system 125 may perform the action requested by the user 5. For example, a weather skill system may enable the system 100 to provide weather information, a car service skill system may enable the system 100 to book a trip with respect to a taxi or ride sharing service, a restaurant skill system may enable the system 100 to order a pizza with respect to the restaurant's online ordering system, etc.

The remote system 120 may communicate with a skill system 125 via Hypertext Transfer Protocol (HTTP) or HTTPS over one or more computer networks such as the network(s) 199, although the disclosure is not limited thereto. Communication between the remote system 120 and a skill system 125 may occur over one or more third-party network; that is, a computer network maintained by a provider not associated with the remote system 120 or the skill system 125 other than by use of the third-party network.

Additionally or alternatively, a skill component 290 may be implemented by a device 110. This may enable the device 110 to execute specific functionality in order to provide data or perform some other action requested by the user 5. The device 110 can host a skill component 290 in the form of an application executing on the device 110. Such a device 110 can be, for example, a mobile device 110 on a mobile network or a local area network (LAN).

The remote system 120, skill system 125, and/or device 110 may each host or otherwise execute instances of same or different skills. In some cases, a single skill—for example, a music skill—may have instances executing on more than one of the remote system 120, skill system 125, and/or device 110. For example, a skill system 125 may host a default instance of a skill while a device 110 hosts a personal instance of the skill. The personal instance of the skill may be a skill instance under development or test on a machine local to and/or operated by a skill developer. In another example, the remote system 120 may host a default instance of a skill while the device 110 hosts a personal instance of the skill in the form of an application executing on the device 110.

The remote system 120 may include a TTS component 280 that generates audio data (e.g., synthesized speech) from text data using one or more different methods. Text data input to the TTS component 280 may come from a skill component 290, a skill system 125, the orchestrator component 230, or another component of the remote system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include profile storage 270. The profile storage 270 may include a variety of data related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to spoken inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 290/skill systems 125 that the user has enabled. When a user enables a skill component 290/skill system 125, the user is providing the remote system 120 with permission to allow the skill component 290/skill system 125 to execute with respect to the user's spoken inputs. If a user does not enable a skill component 290/skill system 125, the remote system 120 may not invoke the skill component 290/skill system 125 to execute with respect to the user's spoken inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data (such as input/output capabilities). A device profile may also include one or more user identifiers, corresponding to one or more user profiles associated with the device profile. For example, a household device's profile may include the user identifiers of users of the household.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the remote system 120 in correlation with a natural language user input, to stored biometric data of users. The user recognition component 295 may additionally or alternatively perform user recognition by comparing image data (e.g., including a representation of at least a feature of a user), received by the remote system 120 in correlation with a natural language user input, with stored image data including representations of features of different users. The user recognition component 295 may perform other or additional user recognition processes, including those known in the art. For a particular natural language user input, the user recognition component 295 may perform processing with respect to stored data of users associated with the device 110 that captured the natural language user input.

The user recognition component 295 determines whether a natural language user input originated from a particular user. For example, the user recognition component 295 may generate a first value representing a likelihood that a natural language user input originated from a first user, a second value representing a likelihood that the natural language user input originated from a second user, etc. The user recognition component 295 may also determine an overall confidence regarding the accuracy of user recognition processing.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill, as well as processing performed by other components of the remote system 120 and/or other systems.

The remote system 120 may also include an input request component 265 that is configured to present a system-generated request to the user 5 to solicit an input from the user as described herein. In case where the audio data 211 is provided by the user 5 in response to a system-generated request, the orchestrator 230 may send the audio data 211 to the input request component 265, instead of the SLU component 240 or the ASR component 250. The input request component 265 processes the audio data 211 and associates the audio data 211 with output labels (e.g., intent, slot types, and slot values). Additionally, the input request component 265 is configured to identify a user (e.g., user 5) to solicit an input from, identify for which output labels annotated data is needed, and generate request data representing the system-generated request to solicit the appropriate input. In the case that the input request component 265 is included in the remote system 120, the request data, along with a session identifier, may be sent to the device 110 via the orchestrator 230, and the audio data 211 representing the response from the user 5 may be sent from the device 110 to the remote system 120. The audio data 211 representing the response from the user 5 may be associated with the session identifier, so that the orchestrator 230 may route the audio data 211 to the input request component 265, instead of the SLU component 240. The input request component 265 may generate labeled data using the response data, and the labeled data may be used by the remote system 120 to update one or more system ML models.

Figure 3:
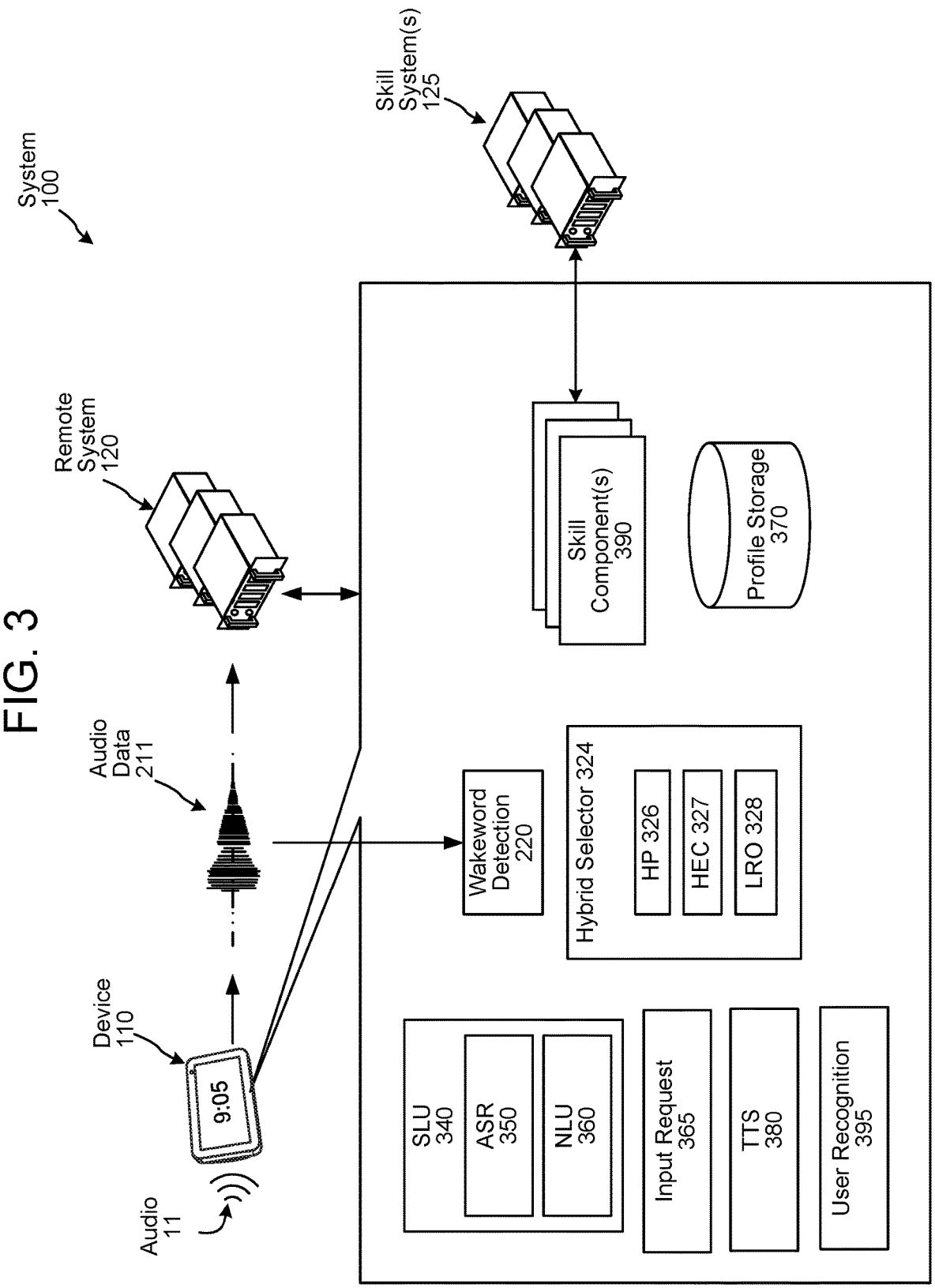
FIG. 3 is a conceptual diagram illustrating components that may be included in a device, according to embodiments of the present disclosure.

The foregoing describes illustrative components and processing of the remote system 120. In at least some embodiments, the device 110 may be configured to include some or all of the components, and perform some or all of the processing of the remote system 120 described above. FIG. 3 illustrates the system 100 as it may be configured to include a device 110 capable of performing speech processing and sensitive data processing. Optimizing the utilization of on-device computing resources (e.g., processing resources, etc.) of the device 110, in at least some situations, can reduce latency so that the user experience with the device 110 is not negatively impacted by local processing tasks taking too long.

In general, the device 110 may be capable of capturing utterances with a microphone(s) and responding in various ways, such as by outputting content (e.g., audio) via an output device(s), which may be loudspeaker(s), a display(s), or any other suitable output component. In addition, the device 110 may be configured to respond to user speech by controlling one or more other devices that are co-located in an environment with the device 110, such as by sending a command to a second device via an input/output communications interface (e.g., a short range radio), the command instructing an operation to be performed at the second device (e.g., to turn on/off a smart light in the environment).

In addition to using a built-in microphone(s) to capture spoken inputs and convert them into digital audio data, a first device 110a may additionally or alternatively receive audio data from a second device 110b in the environment, such as when the second device 110b captures a spoken input from the user 5 and sends the audio data to the first device 110a. This may occur in situations where the second device 110b is closer to the user 5 and would like to leverage the processing capabilities of the first device 110a.

The device 110 may operate in conjunction with and/or under the control of a remote, network-based or network-accessible control system (e.g., the remote system 120). The remote system 120 may, in some examples be part of a network-accessible computing platform that is maintained and accessible via one or more network(s) 199 such as a wide area network. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices 110 of different users. The network(s) 199 is representative of any type of public or private, wide-area network, such as the Internet, which extends beyond the environment of the device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110 and other local devices (located in the same environment as the device 110) may be connected to a private network associated with the environment (e.g., home, business, etc.), and the devices may communicate with the network(s) 199 via the private network.

In at least some embodiments, the remote system 120 may be configured to receive the audio data 211 from the device 110, to recognize speech corresponding to a spoken input in the received audio data 211 using a SLU component 240 (which may be referred to as a remote speech processing system), and to perform functions in response to the recognized speech. In at least some embodiments, these functions involve sending directives (e.g., commands), from the remote system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the remote system 120 over the network(s) 199, some or all of the functions capable of being performed by the remote system 120 may be performed by sending one or more directives over the network(s) 199 to the device 110, which, in turn, may process the directive(s) and perform one or more corresponding actions. For example, the remote system 120, using a remote directive that is included in response data (e.g., a remote response), may instruct the device 110 to output an audible response (e.g., using TTS processing performed by an on-device TTS component 380)

to the user 5's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining a NLU result (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the remote system 120 and/or the local language processing component 340 (in which case the remote system 120 and the local language processing component 340 may process the audio data 211 in parallel, or at least partially in parallel, although the disclosure is not limited thereto). The wakeword detection component 220 may also send an indication, to the hybrid selector 324, representing a wakeword was not detected. In response to receiving such an indication, the hybrid selector 324 may refrain from sending the audio data 211 to the remote system 120, and may prevent the local language processing component 340 from further processing the audio data 211. In this situation, the audio data 211 can be discarded.

The device 110 may conduct its own speech processing using on-device language processing components, such as an ASR component 350 and an NLU 360, similar to the manner discussed above with respect to the ASR component 250 and the NLU component 360 of the remote system 120. The device 110 may also internally include, or otherwise have access to, other components such as one or more skill components 390 capable of executing commands based on NLU results or other results determined by the device 110, a user recognition component 395 (configured to process in a similar manner to that discussed above with respect to the user recognition component 295 of the remote system 120), profile storage 370 (configured to store similar profile data to that discussed above with respect to the profile storage 270 of the remote system 120), or other components. In at least some embodiments, the profile storage 370 may only store profile data for a user or group of users specifically associated with the device 110. Similar to as described above with respect to FIG. 2, a skill component 390 may communicate with a skill system(s) 125.

The device 110 may also include an input request component 365 that is configured to present a system-generated request to the user 5 to solicit an input from the user as described herein. In the case where the audio data 211 is provided by the user 5 in response to a system-generated request, the LRO 328 may send the audio data 211 to the input request component 365, instead of the SLU component 340 or the ASR component 350. The input request component 365 processes the audio data 211 and associates the audio data 211 with output labels. In some embodiments, the remote system 120 may identify a user (e.g., user 5) to solicit an input from, identify for which output labels annotated data is needed, and generate request data representing the system-generated request to solicit the appropriate input. In the case that the input request component 365 is included in the device 110, the request data may be sent to the device 110 from the remote system 120. The device 110 may associate a session identifier with the request data, output the request data, and receive audio data 211 representing the response from the user 5 to the request data. The audio data 211 may be associated with the session identifier, so that the LRO 328 may route the audio data 211 to the input request component 365, instead of the SLU component 340. The audio data 211 may be processed at the device 110 by the input request component 365 to determine labeled input data. The labeled input data may be used by the device 110 to update one or more on-device ML models. Details of the input request component 365 are described in relation to FIG. 5.

In at least some embodiments, the on-device language processing components may not have the same capabilities as the language processing components of the remote system 120. For example, the on-device language processing components may be configured to handle only a subset of the spoken inputs that may be handled by the remote system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the remote system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the remote system 120.

The hybrid selector 324, of the device 110, may include a hybrid proxy (HP) 326. The HP 326 can be implemented as a layer within a voice services component 322 and may be configured to proxy traffic to/from the remote system 120. For example, the HP 326 may be configured to send messages to/from a hybrid execution controller (HEC) 327 of the hybrid selector 324. For example, command/directive data received from the remote system 120 can be sent to the HEC 327 using the HP 326. The HP 326 may also be configured to allow the audio data 211 to pass to the remote system 120 while also receiving (e.g., intercepting) this audio data 211 and sending the audio data 211 to the HEC 327.

In at least some embodiments, the hybrid selector 324 may further include a local request orchestrator (LRO) 328 configured to notify the local language processing component 340 about the availability of new audio data 211 that represents user speech, and to otherwise initiate the operations of the local language processing component 340 when new audio data 211 becomes available. In general, the hybrid selector 324 may control execution of the local language processing component 340, such as by sending "execute" and "terminate" events/instructions to the local language processing component 340. An "execute" event may instruct the local language processing component 340 to continue any suspended execution based on the audio data 211 (e.g., by instructing the local language processing component 340 to execute on a previously-determined intent in order to generate a directive). Meanwhile, a "terminate" event may instruct the local language processing component 340 to terminate further execution based on the audio data 211, such as when the device 110 receives directive data from the remote system 120 and chooses to use that remotely-generated directive data.

Thus, when the audio data 211 is received by the voice services component 322, the HP 326 may allow the audio data 211 to pass through to the remote system 120 and the HP 326 may also input the audio data 211 to the on-device SLU component 340 by routing the audio data 211 through the HEC 327 of the hybrid selector 324, whereby the LRO 328 notifies the on-device SLU component 340 of the incoming audio data 211. At this point, the hybrid selector 324 may wait for response data from either or both of the remote system 120 or the local language processing component 340. However, the disclosure is not limited thereto, and in some examples the hybrid selector 324 may send the audio data 211 only to the local language processing component 341 without departing from the disclosure. For example, the device 110 may process the audio data 211 locally without sending the audio data 211 to the remote system 120.

The on-device SLU component 340 is configured to receive the audio data 211 from the hybrid selector 324, to recognize speech in the audio data 211, to determine a user intent from the recognized speech, and to determine how to act on the user intent by generating NLU output data which may include directive data (e.g., instructing a component to perform an action). Such NLU output data may take a form similar to that as determined by the NLU component 260 of the remote system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the on-device SLU component 340 (and/or the remote system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The SLU component 340 may process the audio data 211 to determine local NLU output data, which may include intent data and/or slot data, so that directives may be determined based on the intent data and/or the slot data. Thus, the SLU component 340 may process the audio data 211 and attempt to make a semantic interpretation of the spoken input represented by the audio data 211 (e.g., determine a meaning associated with the spoken input) and then implement that meaning. For example, the SLU component 340 may interpret the spoken input, in the audio data 211, in order to derive an intent or a desired action or operation from the user 5. This may include deriving pertinent pieces of information from the spoken input that allow the SLU component 340 to identify a second device in the environment, if the user, for example, intends to control a second device (e.g., a light in the user 5's house). The on-device SLU component 340 may also provide a dialog management function to engage in speech dialogue with the user 5 to determine (e.g., clarify) intents by asking the user 5 for information using synthesized speech prompts.

In at least some embodiments, the SLU component 340 may output a single NLU hypothesis determined to most likely representing the spoken input in the audio data 211. Alternatively, in at least some embodiments, the SLU component 340 may output multiple NLU hypotheses in the form of a lattice or an N-best list, with individual NLU hypotheses corresponding to respective confidence values or other values (such as probability values, etc.). In at least some embodiments, the SLU component 340 may be customized to the user 5 (or multiple users) who created a user account to which the device 110 is registered. For example, the SLU component 340 may process the audio data 211 based on known information (e.g., preferences) of the user 5, and/or on a history of previous interactions with the user 5.

NLU output data, as determined by the device 110 and/or the remote system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU results (e.g., NLU output data generated by the device 110) may be evaluated with regard to confidence data for another set of results (e.g., NLU output data generated by the remote system 120).

Thus, an NLU hypothesis may be selected as usable to respond to the spoken input, and the on-device SLU component 340 may send local response data (e.g., local NLU output data and/or local directive data) to the hybrid selector 324, such as a "ReadyToExecute" response, which can indicate that the on-device SLU component 340 has recognized an intent, or is ready to communicate failure (e.g., if the SLU component 340 could not recognize an intent). The hybrid selector 324 may then determine whether to use directive data from the on-device SLU component 340 to respond to the spoken input, to use directive data received from the remote system 120, assuming a remote response is even received (e.g., when the device 110 is able to access the remote system 120 over the network(s) 199), or to generate output audio requesting additional information from the user 5.

The device 110 and/or the remote system 120 may associate a unique identifier with each spoken input. The device 110 may include the unique identifier when sending the audio data 211 to the remote system 120, and the response data from the remote system 120 may include the unique identifier to identify which spoken input the response data corresponds.

In at least some embodiments, the device 110 may include, or be configured to use, one or more skill components 390 that may work similarly to the skill component(s) 290 implemented by the remote system 120. The skill component(s) 390 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill component 125 may be configured in a local environment (e.g., home server and/or the like) such that the device 110 may communicate with the skill component 125 via a private network [such as a local area network (LAN)].

In order to generate a particular interpreted response, the SLU component 340 may apply grammar models and lexical information associated with the respective skill component(s) 390 to recognize one or more entities in the spoken input. In this manner the SLU component 340 may identify "slots" (i.e., particular words in the spoken input) that may be needed for later command processing. Depending on the complexity of the SLU component 340, it may also label each slot with a type of varying levels of specificity (such as noun, place, city, artist name, song name, device name, or the like). Each grammar model used by the SLU component 340 may include the names of entities (i.e., nouns) commonly found in speech about the particular skill component 390 (i.e., generic terms), whereas the lexical information (e.g., from a gazetteer) is personalized to the user 5 and/or the device 110. For example, a grammar model associated with a navigation skill component may include a database of words commonly used when people discuss navigation.

Accordingly, the intents identified by the SLU component 340 may be linked to skill component-specific grammar frameworks with "slots" or "fields" to be filled (e.g., resolved). Each slot/field corresponds to a portion of the spoken input that the SLU component 340 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the SLU component 340 may parse the spoken input to identify words as subject, object, verb, preposition, etc., based on grammar rules and/or models, prior to recognizing named entities. The identified verb may be used by the SLU component 340 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The SLU component 340 may then search the corresponding fields in the skill component-specific and personalized lexicon(s), attempting to match words and phrases in the spoken input tagged as a grammatical object or object modifier with those identified in the database(s).

Various machine learning techniques may be used to train and operate models to perform various processes described herein, such as identifying sensitive data, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
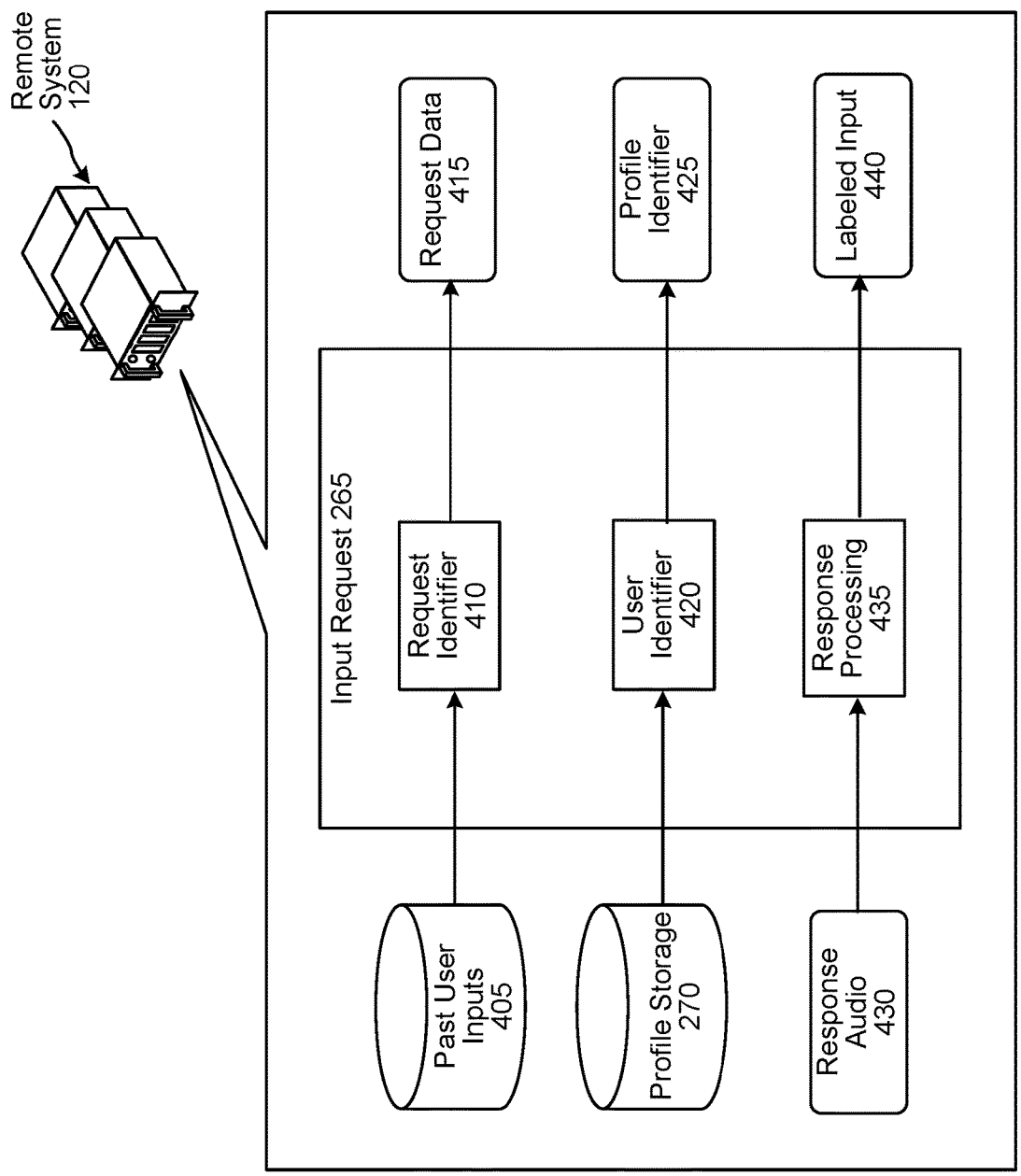
FIG. 4 is a conceptual diagram illustrating an input request component implemented at a remote system, according to embodiments of the present disclosure.

FIG. 4 conceptually illustrates the input request component 265 implemented at the remote system 120. The input request component 265 may include a request identifier component 410, a user identifier component 420, and a response processing component 435.

The request identifier component 410 may be configured to determine request data 415 by determining which past user inputs (stored at storage 405) resulted in user dissatisfaction. For example, the request identifier component 410 may identify a past user input that resulted in dissatisfaction, and determine an intent, slot type, and slot values corresponding to the past user input. These determined intent, slot type(s) and slot value(s) may be determined based on a correct annotation or labeling of the past user input, which may be performed manually (instead of using a ML model(s)). The request identifier component 410 may then generate request data representing a request for the user to speak an input corresponding to the determined intent, slot type and slot values.

Based on the interaction of a user providing the past user input, the value in using the particular past user input for generating labeled data is assessed. For example, in response to the user input "play the song [song name]", the system may start playing a song. If the user listens through the complete song, then that may indicate that the output song was the one desired by user. On the other hand, if the user interrupts the playing of the song (e.g., by saying "stop" or "cancel", or by providing another user input), then that may indicate that the output song was an undesired response. The data during this particular interaction (when the undesired response is generated) may be a potential candidate for generating labeled data.

To identify a past user input that caused dissatisfaction, the request identifier component 410 may process stored data from the past user inputs storage 405 representing past user inputs received by the remote system 120 from multiple different users. The request identifier component 410 identifies the appropriate past user inputs to be used for updating one or more ML models (e.g., ASR models, IC models, NER models, etc.) based on signals provided by the users during the particular interaction with the remote system 120. Such signals include user interruption to the system generated output with respect to the past user input, rephrasing of the initial user input, repeating the initial user input, duration of the interaction, verbal cues (e.g., inflection in voice), non-verbal cues (e.g., button press to stop/interrupt output), and visual cues from the user (e.g., facial expressions). These signals may indicate the user's dissatisfaction with the system generated output, and thus indicate that the ML models may need to be updated to ensure that the dissatisfactory experience is not repeated. The past user inputs storage 405 may store these signals as corresponding with a particular past user input.

The request identifier component 410 may also use a model confidence score associated with the past user input to determine if the past user input should be used to generate labeled data. The model confidence score may be generated by the SLU component 240, the ASR component 250 and/or the NLU component 260 when processing the past user input as described above in connection with FIG. 2. For example, the model confidence score may be a SLU confidence score, ASR confidence score, IC confidence score, NER confidence score, or NLU confidence score. The past user inputs storage 405 may store the confidence score associated with a particular past user input. The model confidence score may be a value between 0 and 1. In other embodiments, the model confidence score may be one of low, medium or high, based on binning the score generated by the SLU component 240, the ASR component 250 or the NLU component 260.

In some embodiments, the request identifier component 410 may also use the number of times (e.g., 1000 times) the past user input was received by the remote system 120 in determining if the past user input should be used to generate labeled data. In other embodiments, the request identifier component 410 may use a receipt frequency indicating the number of times the past user input was received by the remote system 120 during a defined period of time (e.g., 100 times/week, or 1000 times/month, etc.). In some embodiments, the request identifier component 410 may also determine the number of different users that provided the past user input, and use that to determine if the past user input should be used to generate labeled data. In some embodiments, the number of times the past user input is received may be based on how many times the exact past user input is received, which may be represented as a hash-value. In other embodiments, the number of times the past user input is received may be based on how many times semantically similar past user inputs are received. For example, a user input "what is today's weather in Seattle" may be semantically similar to a user input "tell me today's weather for Seattle."

In some embodiments, the request identifier component 410 may determine a candidate score for the past user input based on the model confidence score associated with the past user input, signals provided by the user associated with the past user input, and the number of times the past user input was received by the remote system 120. The request identifier component 410 may use the below equation (1) to determine the candidate score C:

$$C=(A*C_m)+\Sigma B_i*S_i+(G*F) \quad \text{Equation (1)}$$

The candidate score C may be determined by a weighted combination of the model confidence score $C_m$ for the past user input, a real valued representation of the feedback (negative or positive) signals $S_i$ from different interactions, and the receipt frequency F of the past user input. The model confidence score $C_m$ may be the same for each processing instance of the past user input. The signal $S_i$ may be different for each interaction corresponding to the past user input In some embodiments, the feedback signal $S_i$ from multiple users 5a-5n determined using a numerical representation corresponding to the feedback. In some embodiments, the remote system 120 may determine the numerical representation by mapping a particular type of feedback to a particular numerical value (e.g., interrupting the system output may be mapped to −10; smiling may be mapped to +5, etc.) The various numerical representations of the feedback from different users 5a-5n may be aggregated to determine the signal $S_i$.

In other embodiments, $S_i$ may be determined using a machine learning model (e.g., a neural network) that may be configured to aggregate/combine different forms/types of feedback from multiple different users and generate a single value representation of the feedback corresponding to the past user input. In some embodiments, the single value representation may be a numerical value or it may be a binned value.

A, $B_i$, and G in equation (1) represent independently configurable weights that may be used in determining the candidate score for the past user input. These weights for the parameters may be bootstrapped based on the reliability of the user based signals and the correlation of the signal with the candidate score. For example, dissatisfaction experienced with respect to a past user input negatively correlates with user satisfaction, therefore, such past user input is a likely candidate for generating labeled data. The weights may be configured depending on how the corresponding data/factor is to be considered in the candidate score.

The feedback associated with the past user input may be determine based on a sentiment/emotion exhibited by the user. For example, the system 120 may determine sentiment data corresponding to the past user input representing the user's sentiment while providing the past user input or in response to the output, responsive to the past user input, presented by the system 120. The sentiment data may be determined by the system 120 based on acoustic characteristics of the audio data representing the user input, where processing/evaluation of the acoustic characteristics may indicate that the user is happy, sad, content, neutral, frustrated, agitated, angry, disappointed, disgusted, or is exhibiting other sentiments. For example, the user may speak the user input with a certain level of frustration indicated by the acoustic characteristics of the audio data. The sentiment data may be determined by the system 120 based on the content of the user input, where processing/evaluation of text data representing the user input may indicate the user's sentiment. For example, the user may sigh, may say "ugh" or may say other words indicating frustration, disgust, disappointment, or other sentiments. The sentiment data may be determined by the system 120 based on image data captured by a camera of the device 110, where processing/evaluation of the image data may indicate that the user's facial expression, gestures or other actions correspond to a sentiment. For example, while speaking the user input the user may shake his/her head indicating disappointment or frustration. The system 120 may also determine that the user is dissatisfied based on the user interrupting the system 120 while performing an action.

Figure 7:
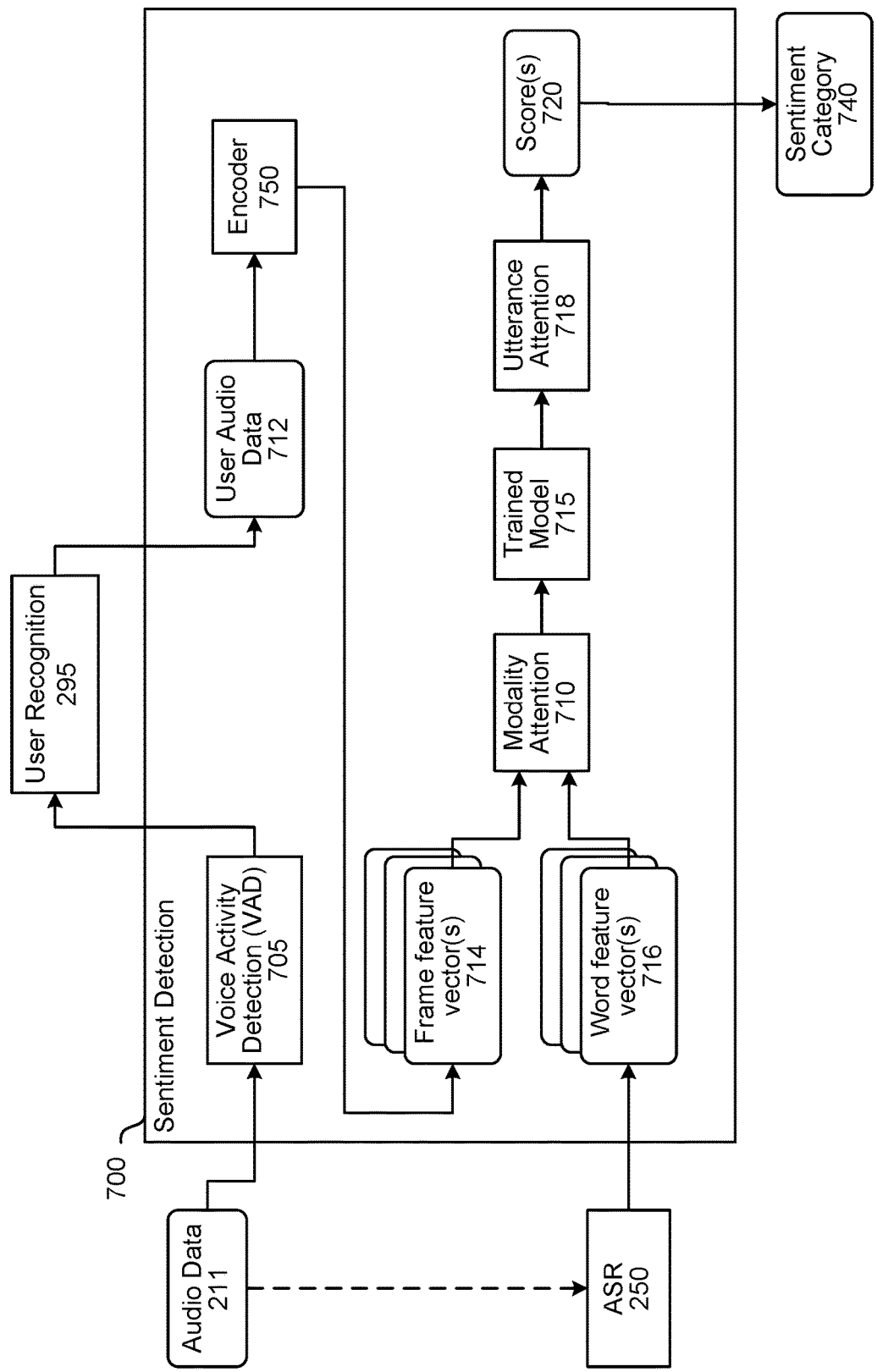
FIG. 7 is a conceptual diagram illustrating a sentiment detection component according to embodiments of the present disclosure.

FIG. 7 is a conceptual diagram illustrating a sentiment detection component according to other embodiments of the present disclosure. The sentiment detection component 700 may be used to determine whether a user is dissatisfied with an output presented by the system 120 in response to a user input. The sentiment detection component 700 may output a sentiment category 740 that may indicate that the user is dissatisfied with the output. In some embodiments, the sentiment detection component 700 may include a voice activity detection (VAD) component 705, a modality attention component 710, a trained model 715 and an utterance attention component 718. The audio data 211 captured by a device 110 may be inputted into the VAD component 705. The sentiment detection component 700 may reside with a device 110a, with another device proximate to, and in communication with device 110 such as device 110b or with a remote device such as with system(s) 120. If the sentiment detection component 700 does not reside on the device 110a that is capturing audio, the sentiment detection component 700 may not necessarily include the VAD component 705 (or may not necessarily include other components) and may or may not include other components as well. The precise composition of the sentiment detection component 700 depends on system configuration.

The VAD component 705 may determine if the audio data 211 includes speech spoken by a human or voice activity by a human, and may determine a portion of the audio data 211 that includes speech or voice activity. The VAD component 705 may send the portion of the audio data 211 including speech or voice activity to the user recognition component 295. The VAD component 705 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 705 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the sentiment detection component 700) may communicate with the sentiment detection component 700 to determine user audio data 712 that corresponds to a particular user profile. The user recognition component 295 may recognize one or more users as described in connection with FIG. 2. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets/satisfies a threshold. If the confidence level for a portion of the input audio data is below a threshold, then the respective portion of input audio is discarded as it does not represent speech from the user associated with the user profile. If the confidence level for a portion of the input audio data meets/satisfies a threshold, then the respective portion of the input audio data is stored as the user audio data 712.

The user audio data 712 may be a portion of the audio data 211 that includes speech or one or more utterances from a particular user associated with the user profile. In other words, audio data representing a particular user's speech may be isolated and stored as the user audio data 712 for further analysis. In an example embodiment, the user may be associated with or using the device 110, and may have provided permission to the system(s) 120 to record and analyze his or her voice/conversations to determine a sentiment category corresponding to the conversation.

Prior to performing further analysis on the user audio data 712, the sentiment detection component 700 may confirm that the user has granted permissions to analyze speech spoken by the user for sentiment detection.

The user audio data 712 may be inputted into an encoder 750 to determine frame feature vector(s) 714. The encoder 750 may be a bidirectional LSTM. The frame feature vector(s) 714 may represent audio frame level features extracted from the user audio data 712. One frame feature vector 714 may represent features corresponding to an individual word in the utterance. The sentiment detection component 700 may determine the portions of user audio data 712 that correspond to individual words and may extract acoustic features from the respective portions of audio using the encoder 750. The frame feature vector(s) 714 may be derived by spectral analysis of the user audio data 712.

The ASR component 250, as described above, may generate an ASR output including text data representative of one or more utterances represented in the audio data 211. In some embodiments, the system sends audio data 211 to the ASR component 250 for processing. In other embodiments, the system sends user audio data 712 to the ASR component 250 for processing. The ASR output may be represented as word feature vectors 716, where each word feature vector 716 may correspond to a word in the text data determined by the ASR component 250 and may represent lexical information of the utterance. The word feature vector 716 may be a word embedding.

In an example embodiment, the sentiment detection component 700 determines that the user audio data 712 includes an entire utterance. That is, the sentiment detection component 700 may determine that a beginpoint of the user audio data 712 corresponds to a beginpoint of an utterance, and an endpoint of the user audio data 712 corresponds to an endpoint of the utterance. In this case, the frame feature vectors 714 and the word feature vectors 716 may represent all the words in one utterance.

The sentiment detection component 700 may align a frame feature vector 714 with a corresponding word feature vector 716 such that the pair represents acoustic information and lexical information, respectively, for an individual word in the utterance represented in user audio data 712. The frame feature vectors 714 and the word feature vectors 716 may be processed by the trained model 715 simultaneously.

The trained model 715 may process the frame feature vector(s) 714 and corresponding word feature vector(s) 716 using a ML model. In some embodiments, the sentiment detection component 700 includes a modality attention component 710 configured to determine how much acoustic information versus how much lexical information from the respective feature vectors 714, 716 should be used by the trained model 715. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 710 may assign a weight or percentage to the data represented by the acoustic feature vectors and the data represented by the lexical feature vectors to indicate the importance of each to the trained model 715.

The trained model 715 may be a neural network, for example a bi-directional LSTM. The output of the trained model 715 may be fed into an utterance attention component 718. The utterance attention component 718 may employ a neural network. The utterance attention component 718 may be configured to emphasize relevant portions of an input utterance. The utterance attention component 718 may be configured to take in output data from the trained model 715 and produce an output for every time step (e.g., a 10 ms audio frame). The utterance attention component 718 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 718 is configured to realize that the first word corresponds to an anger sentiment and that that should affect the processing of the other words in the utterance to ultimately determine a sentiment category corresponding to the utterance.

The utterance attention component 718 may output score 720 indicating a sentiment category 740 for the user audio data 712. The sentiment detection component 700 may predict from multiple sentiment categories, including but not limited to, happiness, sadness, anger and neutral. In an example embodiment, the sentiment category 740 may be determined after score(s) 720 have been determined for a particular period of time of input audio data. In an example embodiment, the sentiment categories may be broad such as positive, neutral, and negative or may be more precise such as dissatisfied, sad, frustrated, angry, happy, distressed, surprised, disgust, or the like.

In some embodiments, the sentiment detection component 700 is configured to determine a sentiment category 740 at an utterance-level. The sentiment detection component 700 may use contextual information from the entire utterance to determine an overall sentiment of the speaker when speaking the utterance. The sentiment detection component 700 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 700 may be configured to determine a sentiment category on a word level (that is for each word within an utterance).

The trained model 715 may take many forms, including a neural network. The trained model 715 may employ a bi-directional LSTM. A neural network may include a number of layers, from input layer 1 through output layer N. Each layer includes one or more nodes and is configured to input a particular type of data and output another type of data. A layer may be represented by a data structure that represents the connections between layers and operations within a layer. The neural network is configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from the penultimate layer. While values for the input data/output data of a particular layer are not known until a neural network is actually operating during runtime, the data describing the neural network describes the structure and operations of the layers of the neural network.

The system 120 may also include a user satisfaction estimator. The user satisfaction estimator may receive the dialog state data and may generate user satisfaction data. The dialog state data may correspond to data associated with a dialog session during which the user provided the past user input. The user satisfaction estimator determines an emotive context of the user (e.g., user satisfaction), which may be represented as a scalar value between 1 and 5 (or some other scale) that indicates whether the user is satisfied (e.g., "5") or unsatisfied (e.g., "1") at a particular point in time.

The dialog state data, input to the user satisfaction estimator, may depend on whether and to what extent a user has explicitly indicated their data may be used for. The dialog state data, input to the user satisfaction estimator, may be restricted to conform with all applicable laws, regulations, and the like. An implementer of the system 120 herein may choose to implement user privacy standards that are stricter than applicable laws, regulations, and the like. A user may exercise significant control over the user's individual data that is used by various components of the system 120, including but not limited to the user satisfaction estimator.

To determine whether the user is pleased or displeased, the user satisfaction estimator may analyze various inputs for evidence of the user's emotional state. For example, the user satisfaction estimator may analyze the audio data 211 to detect variations in the user's speech, such as a change in tone (e.g., when the user is angrily shouting), speech speed, or speech frequency. Similarly, the user satisfaction estimator may analyze (e.g., perform content analysis) the output of the ASR component 250 (e.g., text corresponding to the user's speech) to determine whether the user's speech is positive, negative, or neutral. In an example, the device 110 may include a camera configured to capture image data and the user satisfaction estimator may analyze the image data using facial recognition or the like to identify facial expressions and determine if the facial expressions are positive, negative, or neutral.

The user satisfaction estimator may include components that include machine learning models: a prosody component, a sentiment analysis component, and a satisfaction estimator. The audio data 211 and NLU data (determined by the NLU component 260) may be processed separately by the prosody component and the sentiment analysis component, respectively. Outputs of the prosody component and the sentiment analysis component may be input to the satisfaction estimator, along with other inputs. In some embodiments, the satisfaction estimator may map a dialog state to a user satisfaction value without intermediate prediction.

The dialog state data may include the audio data 211, the NLU data, user feedback data, context data, memory data, user profile data (associated with the user who provided the past user input), etc. The user satisfaction estimator may receive the dialog state data from the orchestrator component 230. The orchestrator component 230 may receive portions of the dialog state data from various components and services of the system 120.

The prosody component may analyze the audio data 211 to determine frequency and amplitude of the user's speech, which may indicate whether the user is satisfied or unsatisfied. The prosody component may be configured to identify changes in tone (e.g., happy, sad, etc.) and determine whether the changes in tone correspond to a user satisfaction. For example, the prosody component may detect fluctuations in speech indicating that the user is annoyed or frustrated, which corresponds to a decreased user satisfaction. Additionally or alternatively, the sentiment analysis component may be configured to analyze the NLU data and identify a sentiment (e.g., positive, neutral, negative) associated with the user input. For example, if the user cancels an action or inputs the same command repeatedly, the sentiment analysis component may determine that the user is unsatisfied and that the system 120 is not performing the desired action. Similarly, if the user input corresponds to a negative comment (e.g., "This machine is so dumb!"), the sentiment analysis component may interpret the user input as an indication that the user satisfaction is low.

The user feedback data may correspond to explicit user feedback indicating whether the user is satisfied or dissatisfied, such as a verbal indication of positive or negative feedback.

In some examples, the user satisfaction estimator may receive image data and may perform computer vision processing to determine information about a user satisfaction based on facial expressions or the like. For example, the user satisfaction estimator may identify common facial expressions and associate the facial expressions with a user satisfaction value, such as a smile corresponding to a high user satisfaction value and a frown corresponding to a low user satisfaction value.

The context data may be non-user specific, such as temporal information (e.g., time of day). The context data may additionally or alternatively be user specific (e.g., may represent a geographic location of the user).

The memory data may indicate stored preferences or annotations associated with the user, the device 110, and/or the system 100. For example, the user may provide a user input corresponding to "Alexa, remember that I hate mushrooms," "Alexa, my passcode is 12345," "Alexa, I will not go to this restaurant anymore," or the like, and the system 120 may store this information to improve future processing. In some examples, the memory data may correspond to personal graph data.

In some examples, personal graph data includes information specific to a the dialog state. For example, if the user input indicates the user would like to request a ride, corresponding personal graph data may indicate a first number of times that the user has used a first skill and a second number of times that the user has used a second skill. This information is specific to the user but also relevant to the current dialog state.

A "dialog" as used herein may refer to data transmissions (such as relating to multiple user inputs and system 120 outputs) between the system 120 and a local device (e.g., the device 110) that all relate to a single originating user input. Thus, the data transmissions of a dialog may share a dialog identifier or other unique identifier that may be used by the orchestrator component 230, skill(s) 290, skill system(s) 125, etc. to track information across the dialog. For example, the device 110 may send the system 120 data corresponding to "Alexa, play jeopardy." The system 120 may output data corresponding to a jeopardy statement to the device 110 for output to a user(s). A user may then respond to the statement, which the device 110 sends as data to the system 120. The sending of data from the device 110 to the system 120 and the sending of data from the system 120 to the device 110 may all correspond to a single dialog related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog may or may not start with speaking of a wakeword. Each user input of a dialog may be associated with a unique user input identifier such that multiple user input identifiers may be associated with a single dialog identifier. Each instance of a user input and corresponding system action/output may be referred to herein as a "turn" of a dialog.

The satisfaction estimator, using one or more trained machine learning models, may generate the user satisfaction data, which includes a user satisfaction value (e.g., between 1 and 5) indicating an estimate of the user's satisfaction with the output of the system 120.

Referring to FIG. 4, the request identifier component 410 may determine the candidate scores for various past user inputs, and select the top scoring past user inputs to use for generating labeled data. For example, the request identifier component 410 may determine a first candidate score for a first past user input using the foregoing information corresponding to the first past user input, a second candidate score for a second past user input using the foregoing information corresponding to the second past user input, and so on.

In some embodiments, in an effort to store inputs provided by users at their respective local devices 110 instead of storing them at the remote system 120, data representing the past user inputs may be sent from the device 110 to the remote system 120 for storing at past user inputs storage 405. The device 110 may send a hash representation of the past user inputs, an encoded representation of the past user input, or another anonymized representation of the past user input.

To generate request data 415 using the determined intent, slot type and slot values, the request identifier component 410 may use a request template (or an output template). In some embodiments, the request template may be structured data that can be used to generate a natural language output. The request template may be associated with a particular intent. For example, a first request template associated with the "GetWeatherIntent" may be "can you tell me how you ask for the weather in <slot value>?", and based on the determined slot value, the request template can be populated.

In some cases, the system-generated request may be broad and may request an input corresponding to the intent and the slot type. For example, the system-generated request may be "can you tell me how you would ask for the weather in a city?" In other cases, the system-generated request may be specific and may request an input corresponding to the intent and the slot value. For example, the system-generated request may be "can you tell me how you would ask for the weather in Seattle?"

In case the system-generated request is to be output as synthesized speech, the request data 415 may be processed by the TTS component 280.

The user identifier component 420 may be configured to identify a user(s) to send the request data 415 to and output a profile identifier(s) 425 corresponding to the user(s). The profile identifier 425 may identify a particular user (e.g., user 5) in the profile storage 270. The remote system 120, via the orchestrator 230, may send the request data 415 respo to a device 110 associated with the profile identifier 425 in the profile storage 270.

For a given past user input, multiple users may have expressed their dissatisfaction.

After determining past user inputs for generating labeled data, the user identifier component 420 may identify a set of users to provide an input that can be used to generate the labeled data. The set of users may be identified based on various factors. In some embodiments, the set of users may be a subset of users who expressed dissatisfaction in response to the output for the selected past user input.

In some embodiments, a user may be selected to provide an input based on a user reliability score/metric indicating the quality of labels obtained from the user in the past. The user reliability score may be determined by evaluating the labeled data generated from past inputs provided by the user to past system-generated requests with respect to stored data. The stored data may correspond to a sample set of natural language inputs. In some embodiments, the sample set of natural language inputs may be labeled (with the corresponding intent, slot type and slot values), in which case, the user identifier component 420 may compare the labeled data generated from past inputs from the user and the labeled data in the stored data. For example, the user identifier component 420 may retrieve data from the profile storage 270 (or other storage) representing past inputs provided by the user 5 to past system-generated requests, where the data may include the labels for the past inputs. Using the retrieved data and the stored data (including labels for the sample set), the user identifier component 420 may determine whether the labels of the retrieved data match the labels of the stored data. Based on the matching of the labels, the user identifier component 420 may compute the user reliability score.

In some embodiments, some of the past user inputs from the user 5 may be evaluated against a set of stored user inputs and corresponding labeled data. The system may evaluate the past user inputs (or a representation of the past user inputs) to determine whether the past user inputs correspond to the stored labeled data to determine the quality of the inputs provided by the user. In some embodiments, the system may ask the user to provide a set of inputs and determine whether those inputs correspond to labeled data. The quality of the user's past user inputs may be considered in determining the user candidate score.

In some embodiments, a user may be selected to provide an input based on a cost factor. A user with a lower cost factor may be selected to provide an input over a user with a higher cost factor. The cost factor may depend on a latency in time in obtaining the input from the user. The latency may be caused by the user taking time in responding to a system-generated request. For example, the device 110 may have presented the request data 415 to the user 5 as a notification that the user 5 can later respond to. In another example, the device 110 may receive the request data 415 from the input request component 265, but may not present the request to the user 5 until a later time, for example, when the user 5 interacts with the device 110, when the device 110 is activated or turned on, when the device 110 is not actively presenting an output responsive to a user input, when the user 5 asks the device 110 if there are any pending system-generated requests, etc. Thus, there may be a latency in time between when the request data 415 is sent to the device 110 and when the user 5 provides a response. The cost factor with respect to the latency caused by the user response time may be determined by evaluating the latencies corresponding to past system-generated requests. For example, the user identifier component 420 may determine how long the user took to respond to multiple past system-generated requests, and determine an average or mean latency.

The latency in time may also be caused by a network latency. For example, there may be a latency caused by network resources or other computing resources in the request data 415 being sent to the device 110 for output.

The cost factor may also depend on how likely the user is to respond to a system-generated request. Based on the number of times the user responded to past system-generated requests or a percentage of the past system-generated requests the user responded to, the user identifier component 420 may determine the cost factor. For example, if the user 5 responded to 50% of the past system-generated requests, then the cost factor may be 0.5. As another example, a first user that responded to 30% of past system-generated requests may have a first cost factor, and a second user that responded to 70% of past system-generated requests may have a second cost factor, where the second cost factor may be lower than the first cost factor. The likelihood of the user responding to a system generated request is indicated as a cost factor because soliciting a user to provide inputs for labeling purposes may result in an undesired user experience if the user is less likely to respond to such soliciting system requests. Therefore, a user who is more likely to respond to a system-generated request, may have a lower cost factor with respect to this particular metric.

In some embodiments, a user may be selected to provide an input based on a profile attribute associated with the user. In order to configure the ML models to remove bias against users with certain attributes, the user identifier component 420 may select users that belong to a group of users for whom the performance of the ML model is dissatisfactory (e.g., results in undesired responses). In some embodiments, the user may be selected from the set of users that indicated dissatisfaction with respect to the past user input. In some embodiments, the user identifier component 420 may identify a set of profile attributes corresponding to the users that indicated dissatisfaction with respect to the past user input. In selecting the user to provide the input, the user identifier component 420 may select the user based on the user's profile attribute matching one of the profile attributes corresponding to the dissatisfied users. Such profile attributes may include demographics (gender, race, age, etc.), geographic location of the user, education background, native language, accents, etc. For example, a set of users in a particular geographic location with a particular native language with a particular accent may experience dissatisfaction with respect to the past user input (selected by the request identifier 410). The user identifier component 420 may select a first user from the particular geographic location to provide an input, may select a second user that speaks the particular native language to provide an input, and may select a third user that speaks with the particular accent to provide an input. In other embodiments, the user identifier component 420 may identify a single user from the particular geographic location with a particular native language with a particular accent. Thus, user identifier component 420 ensures that the inputs received from the selected user(s) improves performance of the ML model(s) with respect to the dissatisfaction experienced by similar users. To determine profile attributes for the user, the user identifier component 420 may retrieve profile data from the profile storage 270 corresponding to the user.

In some embodiments, the user identifier component 420 may determine a user-based score using the user reliability score, the cost factor, and the profile attribute(s) corresponding to the user. The user identifier component 420 may use the below equation (2) to determine a user-based score S:

$$S = W + W_u * U + W_c * C + W_F * F \qquad \text{Equation (2)}$$

To select a user to provide an input, the user identifier component 420 may determine a weighted aggregate of the foregoing factors for each user, where $W_u$ represent the user reliability score and $W_c$ represents the cost factor. F may correspond to profile attribute(s) of the user, where the profile attribute may be represented as one hot encoding. One hot encoding is a process by which categorical variables are converted into a form that could be provided to ML algorithms to perform prediction tasks. W, U, and F represent configurable weights for each of the variables.

After the request data 415 is determined and the profile identifier 425 is determined, the remote system 120 may send the request data 415 to a device 110 associated with the profile identifier 425. In some embodiments, the request data 415 may be text data that is displayed at the device 110 (e.g., as a notification or an output at a display of the device 110). In some embodiments, the request data 415 may be structured data representing a natural language output that is processed by the TTS component 280 to generate synthesized speech representing the request to provide an input. The user 5 may provide a response to the request data 415 by saying the requested input. For example, the request data 415 may cause the device 110 to output "can you tell me how you would ask for the weather in Seattle?" In response to this request, the user 5 may say "What is today's weather for Seattle?" The response provided by the user 5 may be represented by response audio 430.

The response processing component 435 may process the response audio 430 to generate labeled input data 440. The response processing component 435 may use the request data 415 to determine which labels are supposed to represented in the response audio 430. For example, the request data 415 may indicate an intent, a slot type and a slot value(s). The response processing component 435 determines if the response audio data 430 correspond to these labels. The response processing component 435 may perform SLU processing (e.g., using the SLU component 240) to determine if the response audio data 430 corresponds to the intent. In this case, the processing may be efficient (as compared to processing unsolicited user inputs) since the response processing component 435 is determining whether the response audio data 430 corresponds to the particular intent or not, instead of determining which intent the response audio data 430 corresponds to from a plurality of intents.

The response processing component 435 may also process the response audio data 430 to determine which portion of the response audio data 430 represents the slot value indicated in the request data. In the case where the request data 415 included a slot type instead of a particular slot value, the response processing component 435 may determine which portion of the response audio data 430 corresponds to the slot type. Based on this processing, the response processing component 435 may generate the labeled input data 440 representing a labeled natural language input. For example, for the response audio data 430, the labeled input data 440 may be {intent: GetWeatherIntent, slot type: location, slot value: "Seattle"}. In this case, determining which portion of the response audio data 430 represents a slot value is more efficient (as compared to processing unsolicited user inputs) because the response processing system 435 already knows which slot type and slot values are supposed to be represented in the response audio data 430.

The remote system 120 may process the labeled input data 440 and the response audio data 430 to update one or more ML models of the SLU component 240, the ASR component 250 and/or the NLU component 260.

Figure 5:
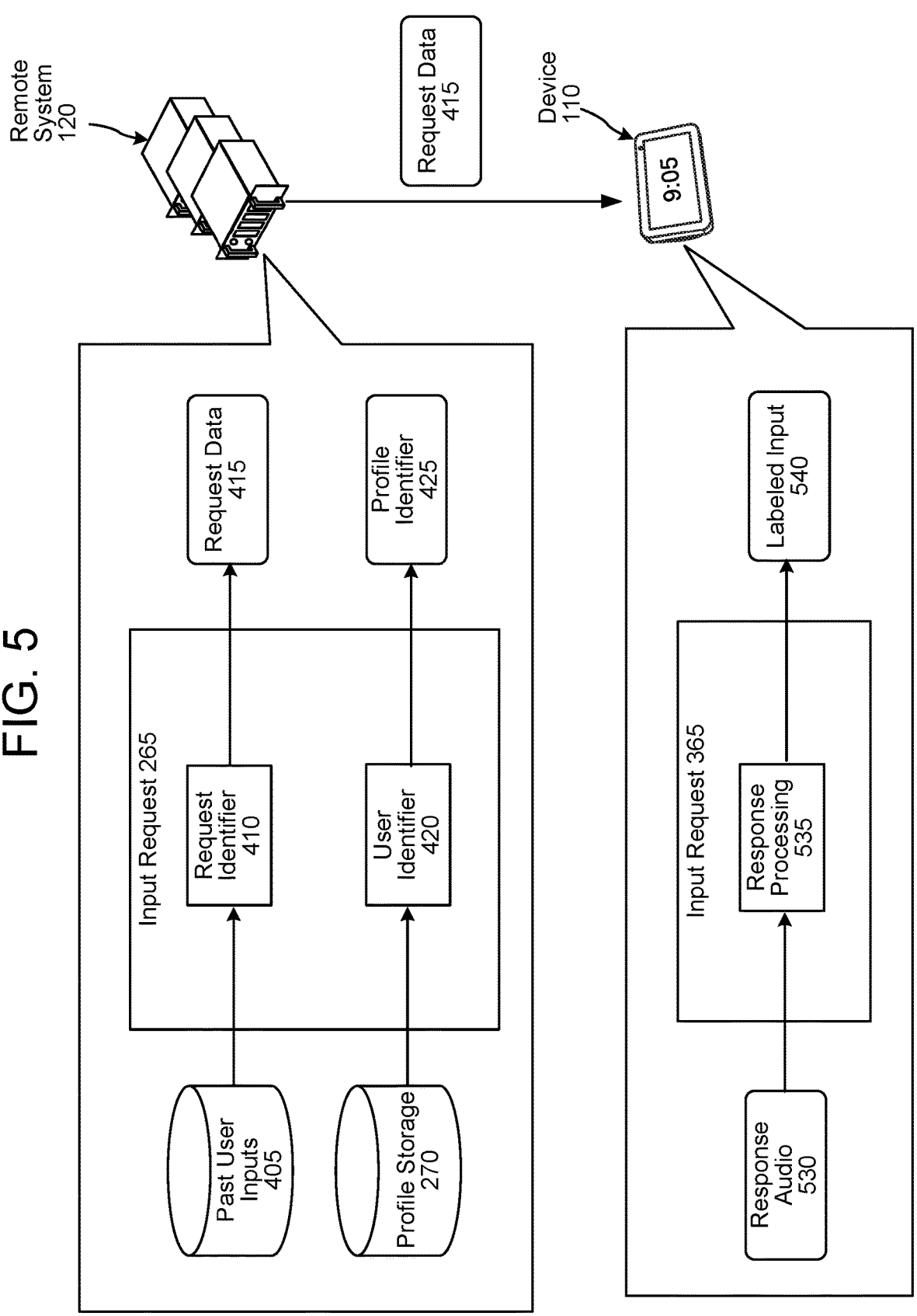
FIG. 5 is a conceptual diagram illustrating an input request component implemented across a remote system and a device, according to embodiments of the present disclosure.

FIG. 5 conceptually illustrates portions of the input request component implemented at the remote system 120 and other portions implemented at the device 110. To avoid sending user inputs to the remote system 120 and to rather store them at the device 110, the components of the input request component may be implemented in a distributed manner. For example, the request identifier component 410 and the user identifier component 420 may be implemented at the remote system 120, as shown in FIG. 5. The response processing component 335 may be implemented at the input request component 365 at the device 110.

The request identifier component 410 and the user identifier component 420 may perform the functionalities described above in relation to FIG. 4. The remote system 120, as illustrated in FIG. 5, may send the request data 415 determined by the request identifier component 410 to the device 110, where the device 110 is associated with the profile identifier 425 determined by the user identifier component 420.

The device 110 may present the request data 415 to the user 5 of the device 110, and may receive response audio data 530. The response audio data 530 may represent the input requested by the device 110 in the request data 415. The response processing component 535 may process the response audio data 530 to determine labeled input data 540, in a similar manner as described with respect to the response processing component 435.

After determining the labeled input data 540, the device 110 may use the labeled input data 540 and the response audio data 530 to update one or more ML models of the SLU component 340, the ASR component 350 and/or the NLU component 360.

Figure 6:
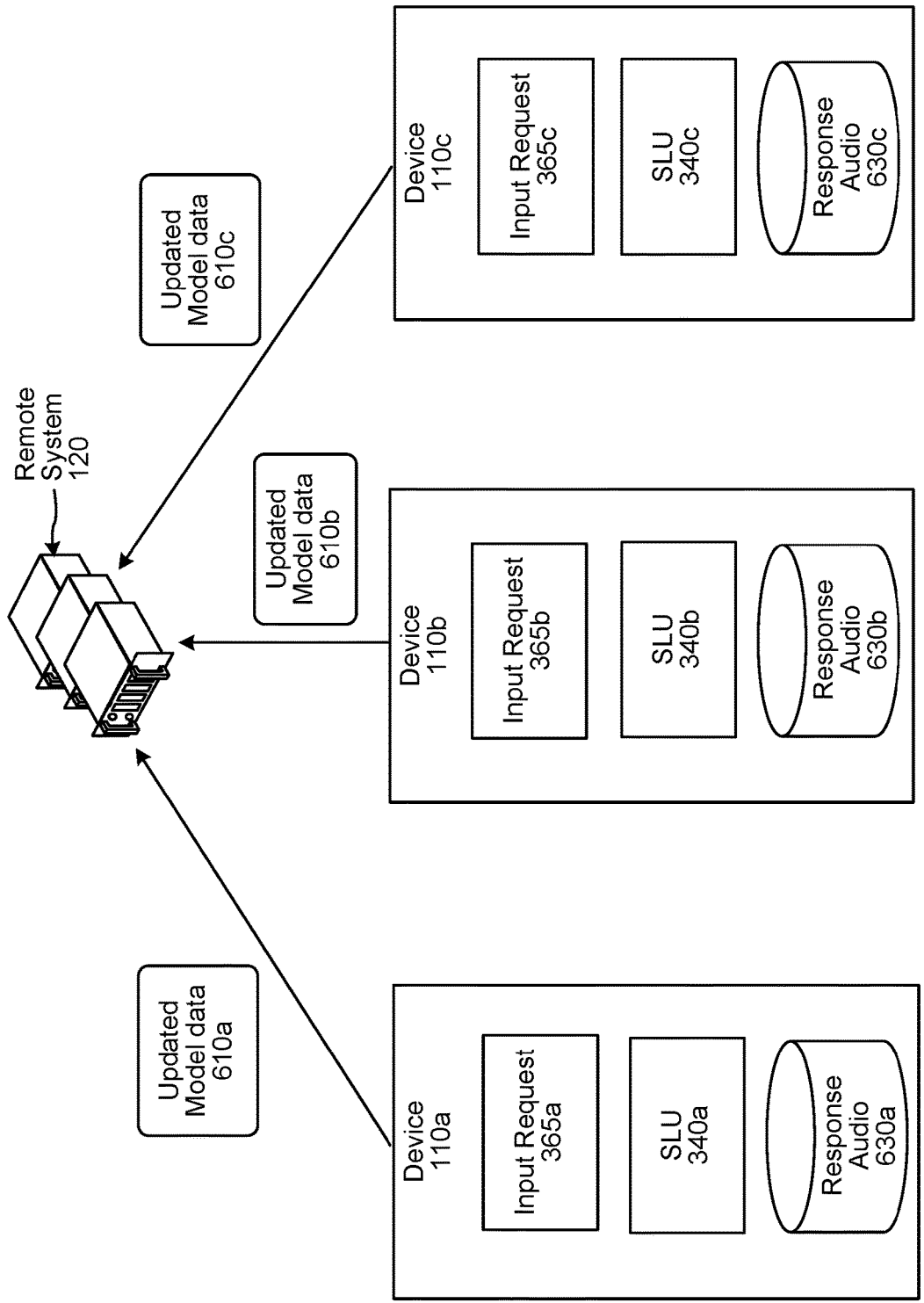
FIG. 6 is a conceptual diagram illustrating how machine learning models may be trained in a federated learning framework, according to embodiments of the present disclosure.

FIG. 6 is a conceptual diagram illustrating a federated learning framework for updating system ML models using updated on-device ML models. As shown in FIG. 6, each of the devices 110a, 110b, and 110c may include a respective instance of the SLU component 340a, 340b and 340c (and respective instances of other components, such as, ASR, NLU, TTS, etc.). Each of the devices 110a, 110b and 110c may also include a respective instance of the input request component 365a, 365b and 365c. Each of the devices 110a, 110b and 110c may also include a response audio storage 630a, 630b, and 630c. The response audio storage 630 may store, for example, the response audio data 530 provided by the user 5 to the device 110. As described in relation to FIG. 5, the input request component 365 may process the response audio data 530 to determine labeled input data 540. Each of the devices 110a, 110b, and 110c may use the labeled input data 540 and the corresponding response audio data 530 to update its respective ML models of the SLU component 340a, 340b and 340c.

In updating the ML models, the device 110 may determine updated ML models for the SLU component 340. The device 110 may determine updated model data 610 representing the data that is updated between the initial ML models of the SLU component 340 and the updated models of the SLU component 340. The updated model data 610 may include gradient data based on the initial ML models and the updated ML models. As used herein, gradient data may refer to a difference in weights (and other parameters) between the initial ML model and the updated ML model. For example, in updating the ML model, the device 110 may train (retrain or configure) an initial ML model using training data that includes at least first labeled input data (e.g., labeled input data 440). During training, the initial weights (and other parameters) of the initial ML model may be updated (changed or modified) to generate the updated ML model associated with updated weights (and other parameters). The gradient data may be the difference in the initial weights and the updated weights.

In some embodiments, the devices 110a-110n may send a representation of the response audio data 630 (e.g. hash-value representation of text or ASR token data corresponding to the response audio data) to the remote system 120, along with labeled input data determined by the devices 110a-110n corresponding to the response audio data.

Each of the devices 110a, 110b and 110c may send its respective updated model data 610a, 610b and 610c to the remote system 120, which may update the system ML models of the SLU component 240 included at the remote system 120. In this manner, using a federated learning framework, the inputs provided by the user 5 are stored at the device 110 and used to update on-device ML models at the device 110. The updated model data corresponding to the updated on-device ML models of the device 110 are sent to the remote system 120 to enable updating of the system ML models at the remote system 120.

Figure 8:
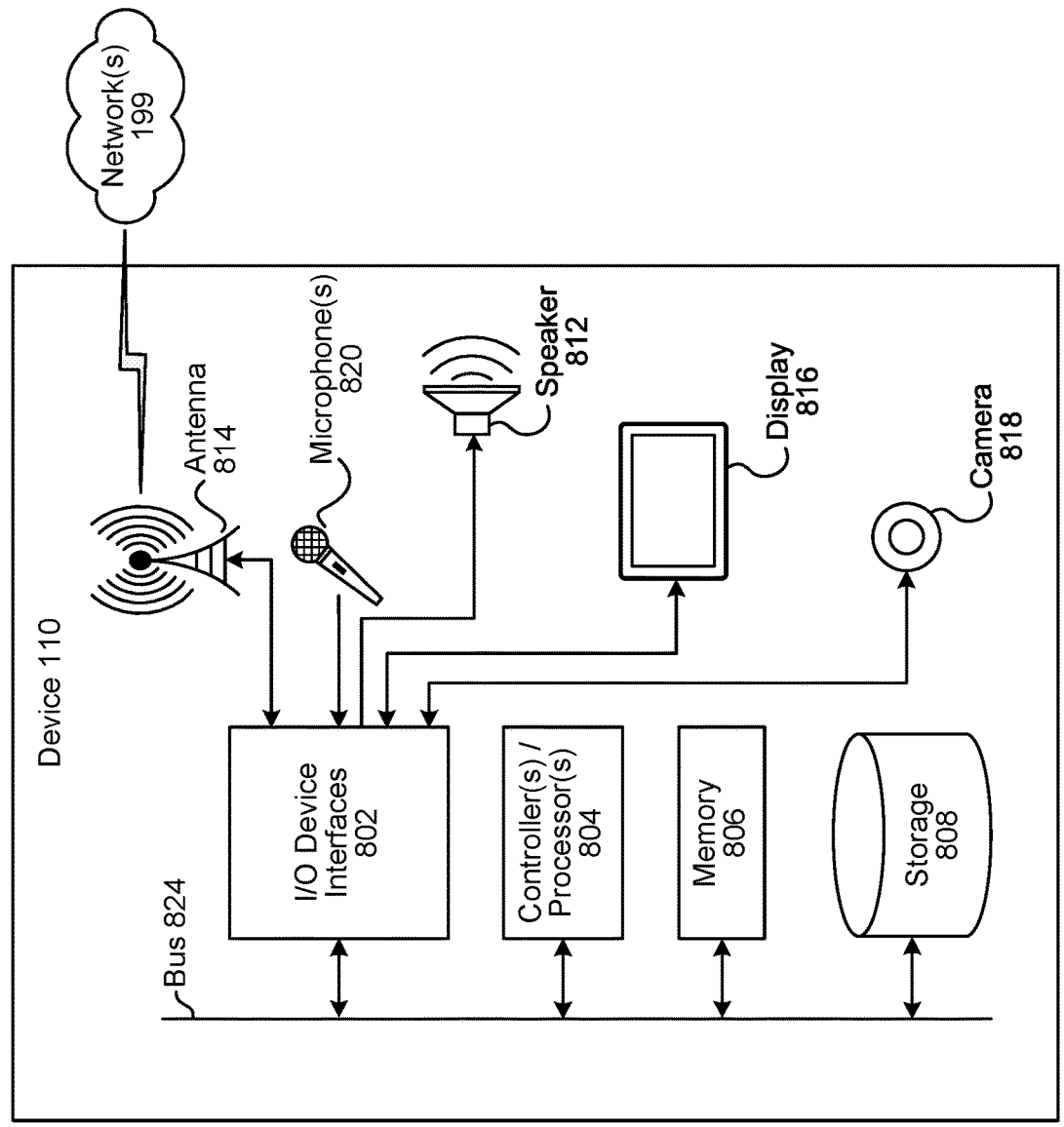
FIG. 8 is a block diagram conceptually illustrating example components of a device, according to embodiments of the present disclosure.
Figure 9:
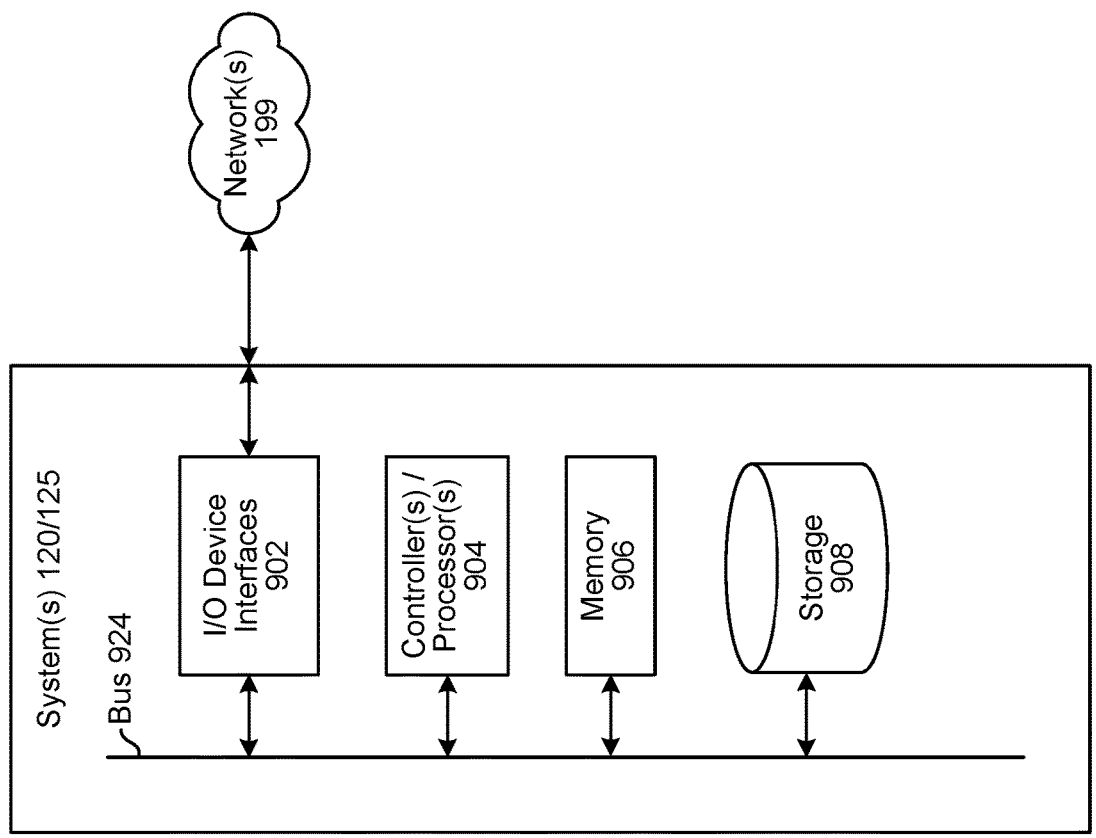
FIG. 9 is a block diagram conceptually illustrating example components of a system, according to embodiments of the present disclosure.

FIG. 8 is a block diagram conceptually illustrating example components of a device 110 according to the present disclosure. FIG. 9 is a block diagram conceptually illustrating example components of a system, such as the remote system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the remote system 120, and/or a skill system 125 may include their own dedicated processors, memory, and/or storage. Alternatively, one or more of the components of the device 110, the remote system 120, and/or a skill system 125 may utilize the I/O interfaces (802/902), processor(s) (804/904), memory (806/906), and/or storage (808/908) of the device(s) 110, remote system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill system 125, as described herein, are illustrative, and may be located as a stand-alone device or may be included, in whole or in part, as a component of a larger device or system.

Figure 10:
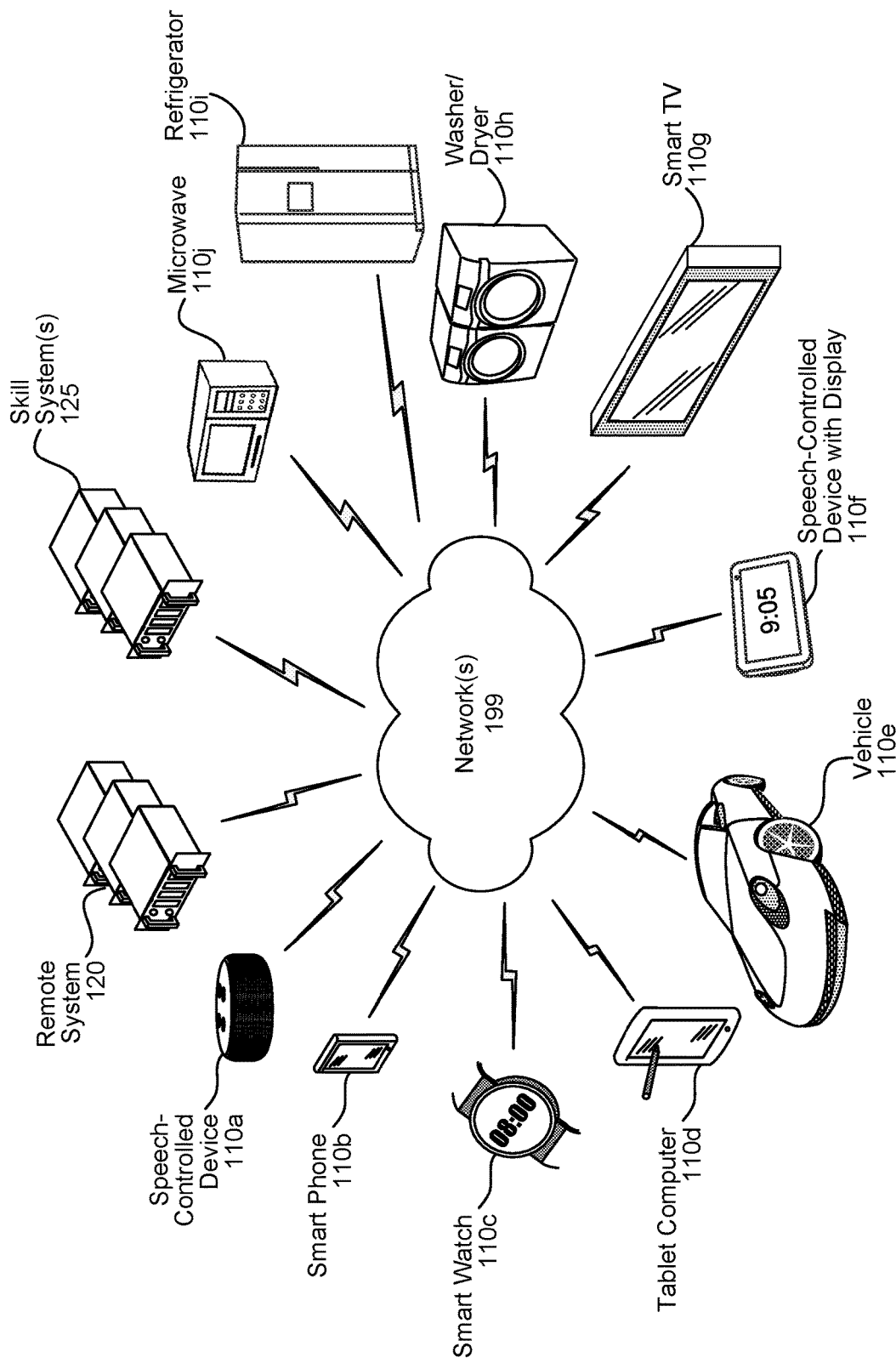
FIG. 10 illustrates an example of a computer network for use with the overall system, according to embodiments of the present disclosure.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining a set of past user inputs associated with a first profile identifier that were used to previously train spoken language understanding (SLU) models;

determining first data based on the set of past user inputs, the first data representing a likelihood of receiving an input, associated with the first profile identifier, to a system-generated request;

determining a time cost metric representing a length of time between when a past system-generated request for a first utterance was output and when a past response to the past system-generated request was received;

identifying a first profile attribute corresponding to the first profile identifier;

selecting, from among a plurality of profile identifiers, the first profile identifier based on the first data, the time cost metric and the first profile attribute;

determining request data indicating a request to speak a second utterance associated with intent data and slot data;

performing text-to-speech (TTS) processing on the request data to determine output audio data;

associating the output audio data with a session identifier;

sending the output audio data to a device associated with the first profile identifier;

receiving, from the device, input audio data representing the second utterance;

associating the input audio data with the session identifier;

processing the input audio data to determine a portion of the second utterance representing the slot data;

determining labeled data by associating:
the intent data with the input audio data, and
the slot data with the portion of the second utterance;

determining a first SLU model associated with first model data stored by the device;

determining second model data by updating the first SLU model using the labeled data;

determining gradient data representing a difference between the first model data and the second model data; and sending, to a remote system, the gradient data to enable the remote system to update a second SLU model stored at the remote system.

2. The computer-implemented method of claim 1, further comprising:

determining a confidence score associated with an output responsive to a past user input, the confidence score being generated by the first SLU model in processing audio data representing the past user input, the confidence score representing a likelihood of the output being a desired response to the past user input;

determining negative feedback data associated with the output, the negative feedback data representing a user interrupting presentation of the output;

determining a number of times the past user input was received; and selecting, from among a plurality of past user inputs, the past user input based on the confidence score, the negative feedback data and the number of times, wherein determining the request data comprises determining the request data using the past user input.

3. The computer-implemented method of claim 2, further comprising:

receiving the negative feedback data from a set of profile identifiers;

determining a set of profile attributes corresponding to the set of profile identifiers;

identifying the first profile attribute included in the set of profile attributes; and determining that the first profile identifier is associated with the first profile attribute.

4. The computer-implemented method of claim 1, further comprising:

receiving image data, captured by a second device, corresponding to an output responsive to a past user input, the image data representing a user sentiment in response to the output;

using the image data, determining negative user feedback data associated with the past user input;

determining intent data associated with the past user input;

determining slot data associated with the past user input;

determining request template data to be used to generate the request to speak the first utterance, the request template data representing a natural language output corresponding to the intent data and the slot data; and populating the request template data with the slot data to determine the request data.

5. A computer-implemented method comprising:

determining, using past input data associated with a first profile identifier, first data indicating a likelihood of receiving a user input, associated with the first profile identifier, to a system-generated request;

selecting the first profile identifier from a plurality of profile identifiers based on the first data;

determining request data representing a system-generated request to prompt a first utterance associated with a first intent and at least a first slot type;

sending, to a device associated with the first profile identifier, the request data for output by the device;

receiving, from the device, first audio data representing the first utterance;

determining second data representing an association of the first audio data with the first intent and the at least first slot type; and generating a second machine learning model configured to process spoken inputs, the second machine learning model being generated by updating a first machine learning model using the second data.

6. The computer-implemented method of claim 5, further comprising:

determining the past input data associated with the first profile identifier, the past input data associated with a second intent and a second slot value;

receiving stored data representing at least one natural language input associated with a third intent and at least a third slot value;

determining user reliability data associated with the first profile identifier based at least in part on processing the past input data with respect to the stored data; and selecting the first profile identifier based on the user reliability data.

7. The computer-implemented method of claim 5, further comprising:

determining a first response time associated with the first profile identifier, the first response time representing a first length of time between when a first past system-generated request was sent to the first profile identifier and when a first past response to the first past system-generated request was received from the first profile identifier;

determining a number of inputs associated with the first profile identifier, the inputs being responsive to a plurality of system-generated requests; and selecting the first profile identifier based on the first response time and the number of inputs.

8. The computer-implemented method of claim 5, further comprising:
   determining a third utterance previously processed by the first machine learning model and resulting in an undesired response, the third utterance corresponding to the first intent and the first slot type;
   determining at least a second profile identifier that provided the third utterance;
   identifying at least a profile attribute corresponding to the second profile identifier; and
   selecting the first profile identifier based on the first profile identifier corresponding to the profile attribute.

9. The computer-implemented method of claim 5, further comprising:
   determining a confidence score associated with the first utterance, the confidence score being generated by the first machine learning model in processing second audio data representing the first utterance;
   determining feedback data associated with an output responsive to the first utterance, the feedback data representing feedback received in response to presenting the output;
   determining a number of times the first utterance is received; and
   selecting the first utterance based on the confidence score, the feedback data and the number of times.

10. The computer-implemented method of claim 5, further comprising:
   processing, at the device, the first audio data to determine third data representing a second utterance;
   determining stored data representing a plurality of slot values corresponding to the first slot type;
   using the stored data, processing, at the device, the third data to identify a portion of the first audio data representing a first slot value of the plurality of slot values; and
   determining, at the device, the first data to represent the portion associated with the first slot value.

11. The computer-implemented method of claim 5, further comprising:
   determining first gradient data based on a difference between the first machine learning model and the second machine learning model; and
   sending the first gradient data to a remote system to enable the remote system to update a third machine learning model configured to process spoken inputs.

12. The computer-implemented method of claim 11, further comprising:
   sending the request data to a second device associated with a second profile identifier;
   receiving, from the second device, second audio data representing a third utterance;
   determining second data associating the second audio data with the first intent and the first slot type;
   using a fourth machine learning model and the second data, generating, at the second device, a fifth machine learning model configured to process spoken inputs;
   determining second gradient data based on a difference between the fourth machine learning model and the fifth machine learning model; and
   sending the second gradient data to the remote system to enable the remote system to update the third machine learning model.

13. A system comprising:
   at least one processor; and
   at least one memory including instructions that, when executed by the at least one processor, cause the system to:
      determine, using past input data associated with a first profile identifier, first data indicating a likelihood of receiving a user input, associated with the first profile identifier, to a system-generated request;
      select the first profile identifier from a plurality of profile identifiers based on the first data;
      determine request data representing a system-generated request to prompt a first utterance associated with a first intent and at least a first slot type;
      send, to a device associated with the first profile identifier, the request data for output by the device;
      receive, from the device, first audio data representing the first utterance;
      determine second data representing an association of the first audio data with the first intent and the at least first slot type; and
      generate a second machine learning model configured to process spoken inputs, the second machine learning model being generated by updating a first machine learning model using the second data.

14. The system of claim 13, wherein the instructions that, when executed by the at least one processor, further cause the system to:
   determine the past input data associated with the first profile identifier, the past input data associated with a second intent and a second slot value;
   receive stored data representing at least one natural language input associated with a third intent and at least a third slot value;
   determine user reliability data associated with the first profile identifier based at least in part on processing the past input data with respect to the stored data; and
   select the first profile identifier based on the user reliability data.

15. The system of claim 13, wherein the instructions that, when executed by the at least one processor, further cause the system to:
   determine a first response time associated with the first profile identifier, the first response time representing a first length of time between when a first past system-generated request was sent to the first profile identifier and when a first past response to the first past system-generated request was received from the first profile identifier;
   determine a number of inputs associated with the first profile identifier, the inputs being responsive to a plurality of system-generated requests; and
   select the first profile identifier based on the first response time and the number of inputs.

16. The system of claim 13, wherein the instructions that, when executed by the at least one processor, further cause the system to:
   determine a third utterance previously processed by the first machine learning model and resulting in an undesired response, the third utterance corresponding to the first intent and the first slot type;
   determine at least a second profile identifier that provided the third utterance;
   identify at least a profile attribute corresponding to the second profile identifier; and
   select the first profile identifier based on the first profile identifier corresponding to the profile attribute.

17. The system of claim 13, wherein the instructions that, when executed by the at least one processor, further cause the system to:
- determine a confidence score associated with the first utterance, the confidence score being generated by the first machine learning model in processing second audio data representing the first utterance;
- determine feedback data associated with an output responsive to the first utterance, the feedback data representing feedback received in response to presenting the output;
- determine a number of times the first utterance is received; and
- select the first utterance based on the confidence score, the feedback data and the number of times.

18. The system of claim 13, wherein the instructions that, when executed by the at least one processor, further cause the system to:
- process, at the device, the first audio data to determine third data representing a second utterance;
- determine stored data representing a plurality of slot values corresponding to the first slot type;
- using the stored data, process, at the device, the third data to identify a portion of the first audio data representing a first slot value of the plurality of slot values; and
- determine, at the device, the first data to represent the portion associated with the first slot value.

19. The system of claim 13, wherein the instructions that, when executed by the at least one processor, further cause the system to:
- determine first gradient data based on a difference between the first machine learning model and the second machine learning model; and
- send the first gradient data to a remote system to enable the remote system to update a third machine learning model configured to process spoken inputs.

20. The system of claim 19, wherein the instructions that, when executed by the at least one processor, further cause the system to:
- send the request data to a second device associated with a second profile identifier;
- receive, from the second device, second audio data representing a third utterance;
- determine second data associating the second audio data with the first intent and the first slot type;
- using a fourth machine learning model and the second data, generate, at the second device, a fifth machine learning model configured to process spoken inputs;
- determine second gradient data based on a difference between the fourth machine learning model and the fifth machine learning model; and
- send the second gradient data to the remote system to enable the remote system to update the third machine learning model.

* * * * *